(12) United States Patent
Horio et al.

(10) Patent No.: US 7,689,742 B2
(45) Date of Patent: Mar. 30, 2010

(54) DATA OUTPUT METHOD, DATA OUTPUT APPARATUS AND COMPUTER PROGRAM PRODUCT

(75) Inventors: Kenichi Horio, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 11/191,720

(22) Filed: Jul. 28, 2005

(65) Prior Publication Data

US 2006/0212617 A1 Sep. 21, 2006

(30) Foreign Application Priority Data

Feb. 25, 2005 (JP) ............... 2005-051992

(51) Int. Cl.
*G06F 3/00* (2006.01)
*G06F 5/00* (2006.01)

(52) U.S. Cl. ...................................................... 710/57
(58) Field of Classification Search .................... 710/57
See application file for complete search history.

(56) References Cited

U.S. PATENT DOCUMENTS

| | | | | |
|---|---|---|---|---|
| 4,718,074 A | * | 1/1988 | Mannas et al. ............... | 375/371 |
| 5,486,784 A | * | 1/1996 | Eriksson ..................... | 327/165 |
| 5,506,967 A | * | 4/1996 | Barajas et al. ............... | 711/118 |
| 5,583,858 A | * | 12/1996 | Hanaoka ..................... | 370/392 |
| 5,771,356 A | * | 6/1998 | Leger et al. .................. | 709/233 |
| 5,936,939 A | * | 8/1999 | Des Jardins et al. .......... | 370/229 |
| 6,031,821 A | * | 2/2000 | Kalkunte et al. ............. | 370/235 |
| 6,138,189 A | * | 10/2000 | Kalkunte .................... | 710/53 |
| 6,643,719 B1 | * | 11/2003 | Baker ........................ | 710/57 |
| 6,658,027 B1 | * | 12/2003 | Kramer et al. ............... | 370/516 |
| 6,683,889 B1 | * | 1/2004 | Shaffer et al. ............... | 370/516 |
| 6,859,851 B1 | * | 2/2005 | Sheaffer ..................... | 710/52 |
| 7,170,856 B1 | * | 1/2007 | Ho et al. ..................... | 370/230 |
| 2005/0094563 A1 | | 5/2005 | Takeshita et al. | |
| 2005/0223141 A1 | * | 10/2005 | Seto et al. ................... | 710/57 |

FOREIGN PATENT DOCUMENTS

| | | |
|---|---|---|
| JP | 11-215182 | 8/1999 |
| JP | 11215182 A * | 8/1999 |
| JP | 2003-087317 | 3/2003 |
| JP | 2005-136742 | 5/2005 |

OTHER PUBLICATIONS

Japanese Office Action mailed Apr. 22, 2008, from the corresponding Japanese Application.

* cited by examiner

*Primary Examiner*—Niketa I Patel
*Assistant Examiner*—Farley J Abad
(74) *Attorney, Agent, or Firm*—Katten Muchin Rosenman LLP

(57) ABSTRACT

A data output apparatus checks data accumulated state in the accumulating unit at a preset check interval, and changes at least one setting among an initial accumulation amount to be used as a basis for starting to output the data accumulated in the accumulating unit, an upper accumulation limit amount to be used as a basis for discarding accumulated data, and a check interval, according to a discarded state of the data based on check results. Therefore, in the data output apparatus such as an IP telephony terminal apparatus, it is possible to prevent sound interruption and limit a lowering of communication quality.

15 Claims, 18 Drawing Sheets

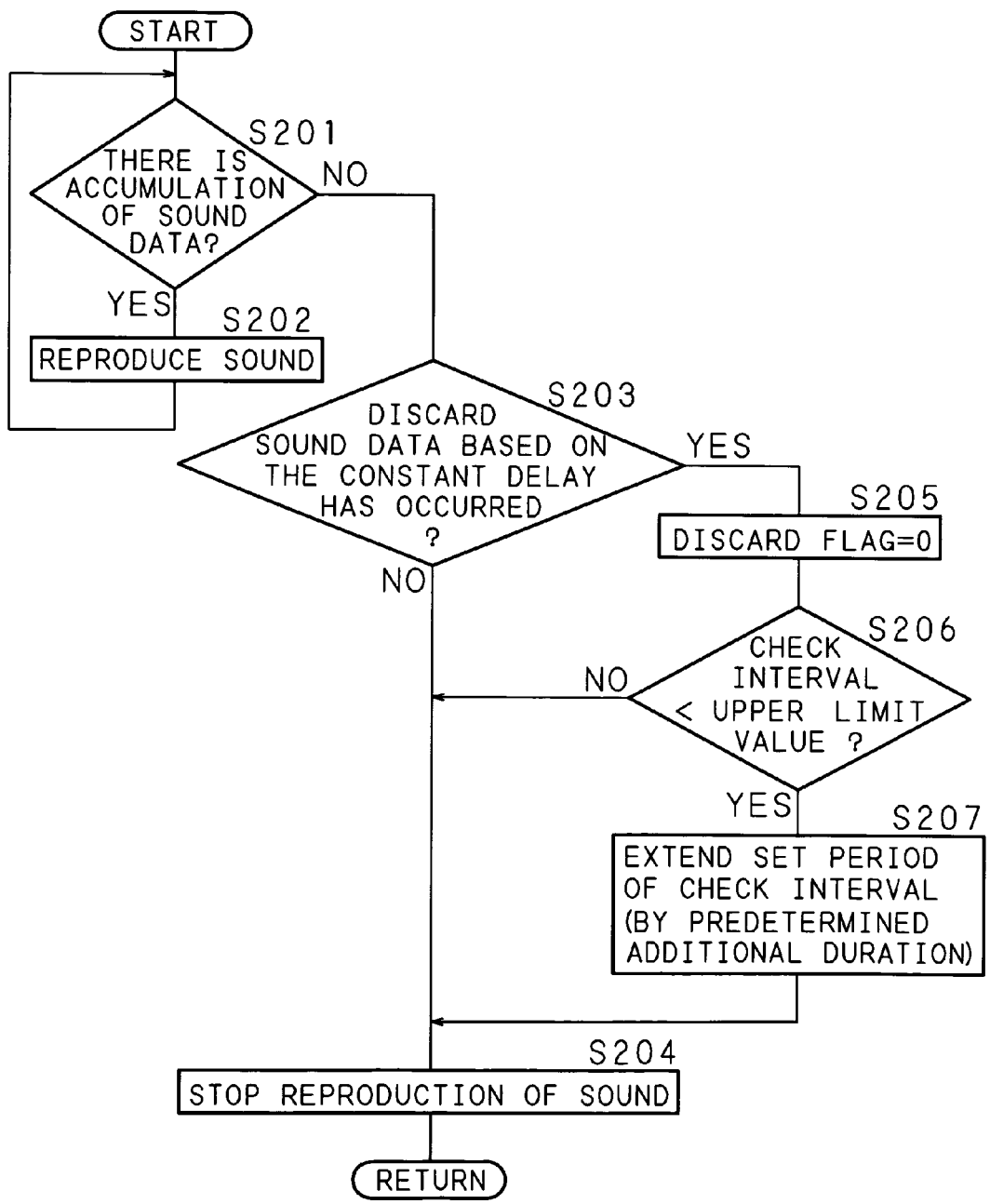

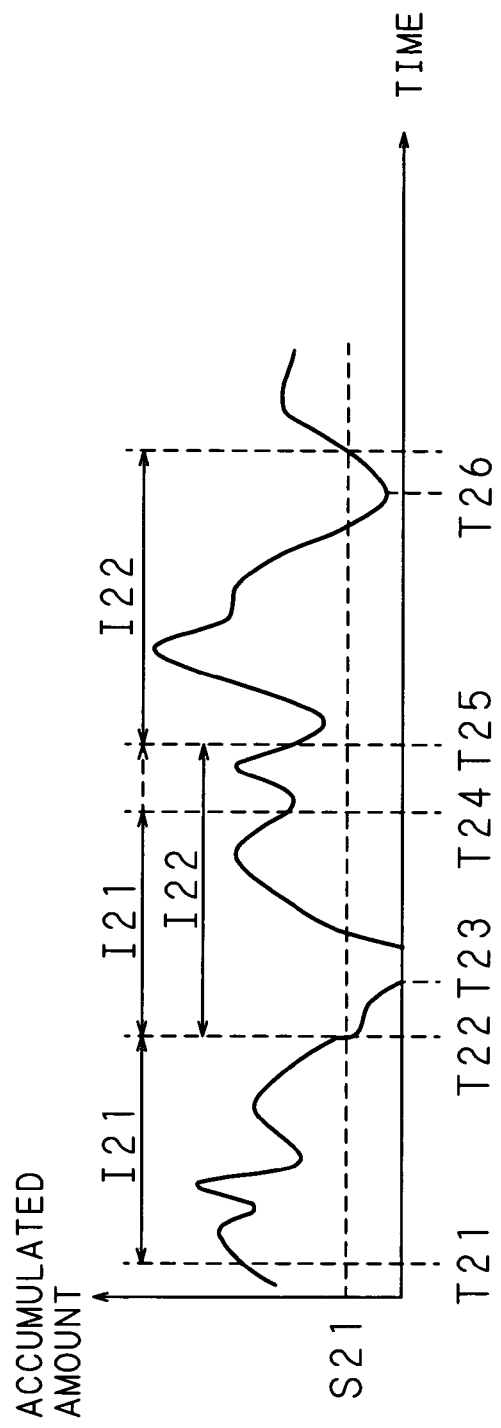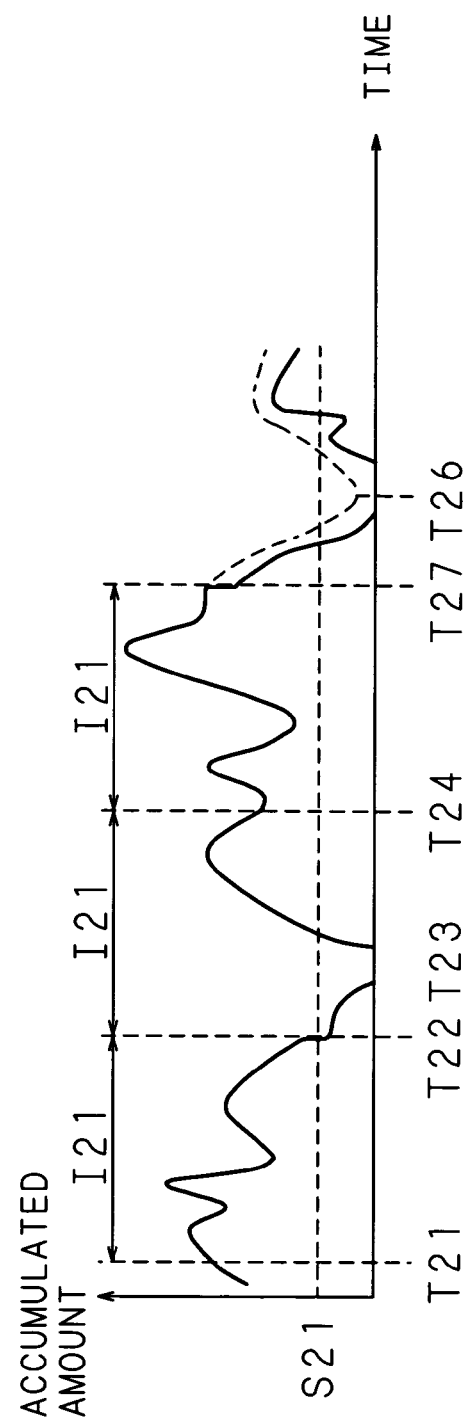

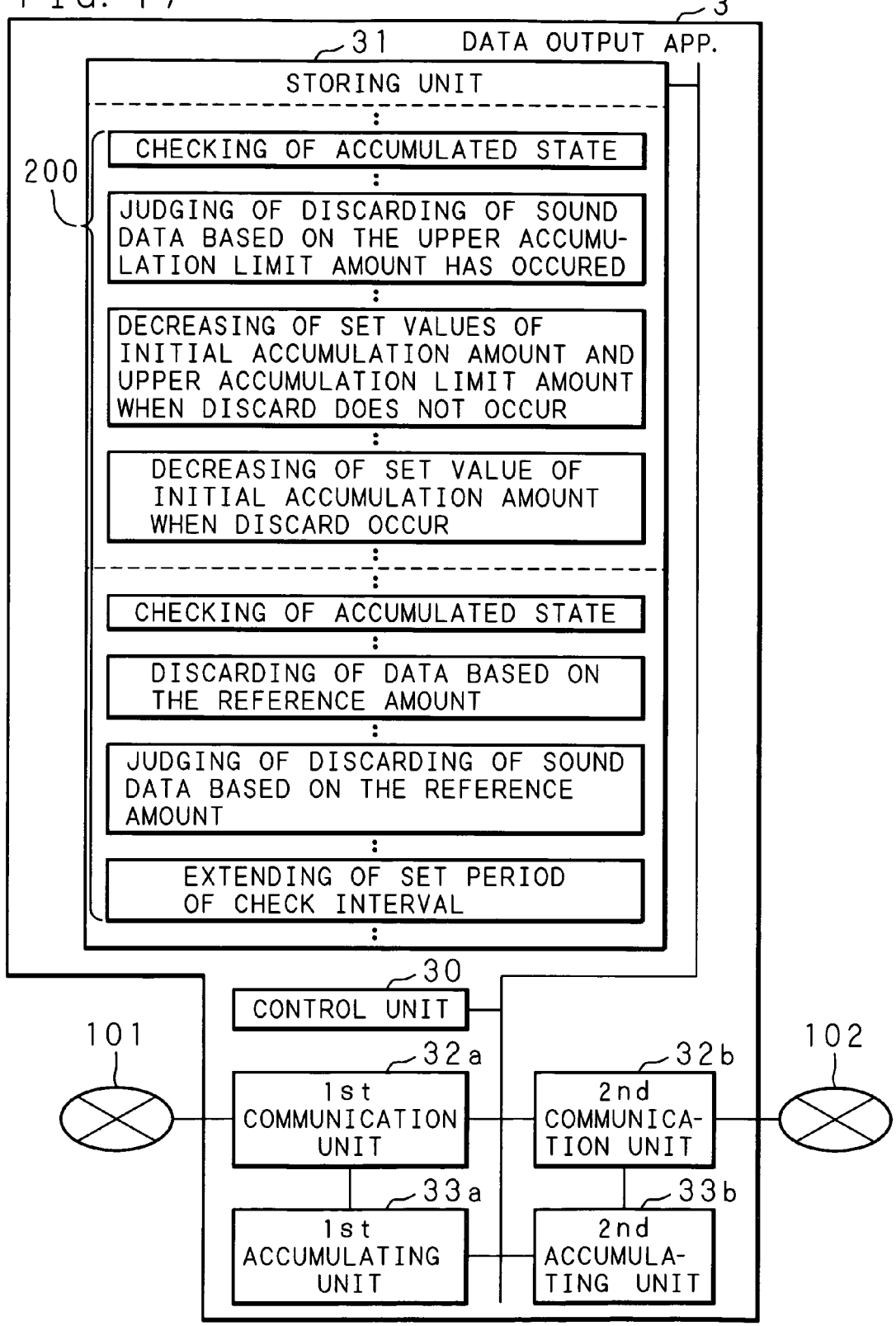

DATA OUTPUT METHOD, DATA OUTPUT APPARATUS AND COMPUTER PROGRAM PRODUCT

CROSS-REFERENCE TO RELATED APPLICATION

This non-provisional application claims priority under 35 U.S.C. §119 (a) on Patent Application No. 2005-51992 filed in Japan on Feb. 25, 2005, the entire contents of which are hereby incorporated by reference.

BACKGROUND OF THE INVENTION

1. Field of the Invention

The present invention relates to a data output method for temporarily accumulating received data and performing output based on the accumulated data, a data output apparatus adopting such a data output method, and a computer program product for realizing such a data output apparatus. In particular, the present invention relates to a data output method, a data output apparatus, and a computer program product suitable for real-time communication such as VoIP and streaming distribution.

2. Description of Related Art

In recent years, there is an increasing use of applications that enable real-time communication such as VoIP (Voice over Internet Protocol), VoPN (Voice over Packet Network) and streaming distribution in which voice and/or video data is transmitted and received between apparatuses through a communication network such as an IP network. In particular, IP telephony that is one example of such applications is spread rapidly. In the IP telephony system, by transmitting and receiving voice data in the form of packets through an IP network, communication is realized between an apparatus at the transmitting end of packets and an apparatus at the receiving end of packets. However, in the communication through the IP network, since the arrival delay time required for transferring packets from the apparatus at the transmitting end to the apparatus at the receiving end varies depending on each packet, there is a problem of jitter. The jitter in the arrival delay time is a serious problem for IP telephony that is required to perform real-time and continuous communication. In order to solve such a problem, in the IP telephony system, the apparatus at the receiving end of packets is provided with a buffer called a "jitter buffer". The apparatus (IP phone set) at the receiving end having the jitter buffer realizes stable voice outputted by temporarily accumulating received packets in the jitter buffer and absorbing the jitter in the arrival delay time before outputting the packets as voice.

When outputting voice using the jitter buffer in such a manner, the larger the accumulation capacity of the jitter buffer for accumulating packets, the greater the ability of absorbing the jitter in the arrival delay time, but there is a problem that the delay from the arrival of a packet to the output of the packet becomes larger. In order to solve such a problem, Japanese Patent Application Laid-Open No. 2003-87317 discloses a method in which an arrival delay time is calculated by measuring the arrival time intervals of packets, and a discard threshold value, namely the accumulation capacity of the jitter buffer is determined based on the jitter in the calculated arrival delay time.

However, the method of measuring the arrival time intervals of packets as disclosed in the Japanese Patent Application Laid-Open No. 2003-87317 has problems that a device for measuring the arrival time is required, and the method depends on the assumption that the data amount transmitted from the transmitting end and the data amount received and reproduced at the receiving end are equal.

Therefore, for example, when the data amount transmitted from the transmitting end in a predetermined period is larger than the data amount reproduced at the receiving end, data reproduction at the receiving end cannot catch up with the transmission of data and the buffer is always in an overflow state, and consequently reproduction delay corresponding to the buffer capacity occurs constantly, namely a constant delay occurs. In this case, even when the data exceeding the buffer capacity is discarded after elapse of a predetermined time, the problem of constant delay mentioned above cannot be solved. In other words, with the prior art, the buffer capacity intended to be used for absorbing the transmission delay jitter is reduced due to the difference between the transmitted data amount and the reproduced data amount, and causes a problem that there is always a reproduction delay corresponding to the buffer capacity, more specifically the time required for reproducing the data amount corresponding to the buffer capacity. In order to solve such a problem, the applicant of the present application in Japan has applied an invention of monitoring the accumulated amount to detecting the occurrence of a constant delay and optimizing the accumulation capacity of the jitter buffer according to the state of the constant delay (Japanese Patent Application Laid-Open No. 2005-136742). In this invention, it is possible to set the accumulation capacity of the jitter buffer to an appropriate value by taking into account the jitter in the arrival delay time and the jitter during reproduction.

Further, in the above-described prior art, when data exceeding the buffer capacity is discarded, there arises a problem that sound interruption occurs due to shortage of data. This problem also occurs in the above-mentioned Japanese Patent Application Laid-Open No. 2005-136742 because when the constant delay is detected, the upper accumulation limit of the jitter buffer is always decreased irrespective of the details of the past data accumulation, and therefore the frequency that the accumulated amount of data exceeds the upper accumulation limit of the jitter buffer by the subsequent reception of data increases. As a result, the frequency of discarding the data exceeding the upper accumulation limit increases, and sound interruption tends to occur.

BRIEF SUMMARY OF THE INVENTION

The present invention has been made with the aim of solving the above problems, and it is an object of the present invention to provide a data output method capable of reducing the occurrence of constant delay and preventing sound interruption, and to provide a data output apparatus adopting such a data output method, and a computer program product for realizing such a data output apparatus.

More precisely, the present invention makes it possible to reduce the occurrence of constant delay and prevent sound interruption by checking the accumulated amount of data in an accumulating unit (jitter buffer), at a preset check interval, and changing the set value of an initial accumulation amount to be used as a basis for starting to output the data accumulated in the accumulating unit, the set value of an upper accumulation limit amount to be used as a basis for discarding data, and the set period of the check interval for checking the accumulated amount, according to a change in the accumulated amount and the occurrence of discarding of data.

A data output method according to the first aspect of the invention is a data output method for accumulating received data in an accumulating unit to which an initial accumulation amount as a basis for starting to output the accumulated data and an upper accumulation limit amount as a basis for discarding the accumulated data are set, and performing output based on the data accumulated in the accumulating unit, and is characterized by comprising the steps of checking an accumulated state of the data accumulated in the accumulating unit, at a preset check interval; and changing at least one setting among the initial accumulation amount, the upper accumulation limit amount and the check interval, according to a discarded state of the data based on check results.

A data output apparatus according to the first aspect of the invention is a data output apparatus having an accumulating unit, to which an initial accumulation amount as a basis for starting to output accumulated data and an upper accumulation limit amount as a basis for discarding the accumulated data are set, for accumulating received data in the accumulating unit and performing output based on the data accumulated in the accumulating unit, and is characterized by comprising: checking means for checking an accumulated state of the data accumulated in the accumulating unit, at a preset check interval; and setting changing means for changing at least one setting among the initial accumulation amount, the upper accumulation limit amount and the check interval, according to a state of the data discarded based on the check performed by the checking means.

A computer program product according to the first aspect of the invention is a computer program product, coupled to a memory device, to which an initial accumulation amount as a basis for starting to output accumulated data and an upper accumulation limit amount as a basis for discarding the accumulated data are set, for accumulating received data in the memory device and controlling output based on the accumulated data, and is characterized in that the computer program product comprises: a computer readable storage medium having computer readable program code means embodied in the medium, the computer readable program code means comprising computer instruction means for: checking an accumulated state of the data accumulated in the memory device, at a preset check interval; and changing at least one setting among the initial accumulation amount, the upper accumulation limit amount and the check interval, according to a discarded state of the data based on check results.

A data output method according to the second aspect of the invention is based on the data output method of the first aspect, and characterized in that the step of changing setting further includes the steps of: judging whether or not discarding of data based on the upper accumulation limit amount has occurred, when a judgment is made in the step of checking that an accumulated amount of the data accumulated in the accumulating unit is not less than a predetermined reference amount; decreasing set values of the initial accumulation amount and the upper accumulation limit amount, when a judgment is made that the discarding of the data has not occurred; and decreasing the set value of the initial accumulation amount, when a judgment is made that the discarding of the data has occurred.

A data output apparatus according to the second aspect of the invention is based the data output apparatus of the first aspect, and characterized in that the setting changing means includes: judging means for judging whether or not discarding of the data based on the upper accumulation limit amount has occurred, when the checking means judges that an accumulated amount of the data accumulated in the accumulating unit is not less than a predetermined reference amount; means for decreasing set values of the initial accumulation amount and the upper accumulation limit amount, when the judging means judges that the discarding of the data has not occurred; and means for decreasing the set value of the initial accumulation amount, when the judging means judges that the discarding of the data has occurred.

A computer program product according to the second aspect of the invention is based the computer program product of the first aspect, and characterized in that the computer instruction means for changing the settings includes computer instruction means for: judging whether or not discarding of the data based on the upper accumulation limit amount has occurred, when an accumulated amount of the data accumulated in the memory device is judged to be not less than a predetermined reference amount on the basis of the check results; decreasing set values of the initial accumulation amount and the upper accumulation limit amount, when a judgment is made that the discarding of the data has not occurred; and decreasing the set value of the initial accumulation amount, when a judgment is made that the discarding of the data has occurred.

A data output method according to the third aspect of the invention is based on the data output method of the first aspect, and characterized in that the step of changing setting further includes the steps of discarding the data accumulated in the accumulating unit, when a judgment is made in the step of checking that an accumulated amount of the data accumulated in the accumulating unit is not less than a predetermined reference amount; judging whether or not a non-accumulated state in which no data is accumulated in the accumulating unit has occurred; judging whether or not discarding of the data based on the reference amount has occurred, when a judgment is made that the non-accumulated state has occurred; and extending a set period of the check interval, when a judgment is made that the discarding of the data based on the reference amount has occurred.

A data output apparatus according to the third aspect of the invention is based on the data output apparatus of the first aspect, and characterized in that the setting changing means includes: data discarding means for discarding the data accumulated in the accumulating unit, when the checking means judges that an accumulated amount of the data accumulated in the accumulating unit is not less than a predetermined reference amount; non-accumulated state judging means for judging whether or not a non-accumulated state in which no data is accumulated in the accumulating unit has occurred; data discarding judging means for judging whether or not discarding of the data based on the reference amount has occurred, when the non-accumulated state judging means judges that the non-accumulated state has occurred; and check interval setting means for extending a set period of the check interval, when the data discarding judging means judges that the discarding of the data has occurred.

A computer program product according to the third aspect of the invention is based on the computer program product of the first aspect, and characterized in that the computer instruction means for changing the settings includes computer instruction means for: discarding the data accumulated in the memory device, when an accumulated amount of the data accumulated in the memory device is judged to be not less than a predetermined reference amount on the basis of the check results; judging whether or not a non-accumulated state in which no data is accumulated in the memory device has occurred; judging whether or not discarding of the data based on the reference amount has occurred, when a judgment is made that the non-accumulated state has occurred; and extending a set period of the check interval, when a judgment is made that discarding of the data based on the reference amount has occurred.

A data output apparatus according to the present invention is based on the data output apparatus of the third aspect, and characterized in that the setting changing means further includes non-accumulated state duration calculating means for calculating a non-accumulated state duration from a time point at which the checking means checked the accumulated state to a time point at which the non-accumulated state judging means detected occurrence of the non-accumulated state, and the check interval setting means determines an additional duration for extending the check interval based on the non-accumulated state duration calculated by the non-accumulated state duration calculating means.

A data output apparatus according to the present invention is based on the data output apparatus of the third aspect, and characterized in that the setting changing means further includes non-accumulated state occurrence interval calculating means for calculating an interval between respective time points at which the non-accumulated state occurred, when the non-accumulated state judging means judges that the non-accumulated state occurred a plurality of times, and the check interval setting means determines an additional duration for extending the check interval based on the duration calculated by the non-accumulated state occurrence interval calculating means.

A data output apparatus according to the present invention is based on the data output apparatus of the third aspect, and characterized in that the setting changing means further includes non-accumulated state duration calculating means for calculating a duration from a time point at which the checking means checked the accumulated state to a time point of the last occurrence of the non-accumulated state, when the non-accumulated state judging means judges that the non-accumulated state occurred a plurality of times, and the check interval setting means determines an additional duration for extending the check interval based on the duration calculated by the non-accumulated state duration calculating means.

A data output method, data output apparatus and computer program product of the present invention are applied, for example, to an apparatus at a receiving end in packet communication, such as an IP telephony system, or a relay apparatus such as an Internet router, accumulates received data, particularly sound data of a real-time application, in an accumulating unit (memory device) functioning as a jitter buffer for accumulating the received data, and performs output such as the reproduction of sound based on the accumulated sound data, and the transmission as packets. Moreover, in the present invention, an initial accumulation amount as a basis for starting to output the accumulated data and an upper accumulation limit amount as a basis for discarding the received data are set for the accumulating unit. Further, the accumulated state of the data accumulated in the accumulating unit is checked at a predetermined check interval, and when the accumulated amount of the data accumulated in the accumulating unit is not less than a predetermined reference amount to be used as a basis for detecting a constant delay, a judgment is made as to whether or not discarding of the data based on the upper accumulation limit amount has occurred. As a result, when a judgment is made that discarding of the data has not occurred, the set values of the initial accumulation amount and the upper accumulation limit amount are decreased, whereas when a judgment is made that discarding of data has occurred, the set value of the initial accumulation amount is decreased.

According to the present invention, when the accumulated amount of the data is not less than the predetermined reference amount, a judgment is made that the constant delay has occurred, and further when discarding of data based on the upper accumulation limit amount has not occurred at this time point, it is possible to reduce the occurrence of constant delay by decreasing the set values of the initial accumulation amount and the upper accumulation limit amount. In addition, when discarding of the data based on the upper accumulation limit amount has occurred, a judgment is made that not only the constant delay has occurred but also large jitter has occurred in the transfer time, and only the set value of the initial accumulation amount is decreased. Consequently, not only the occurrence of constant delay is reduced, but also the occurrence of discarding of the data due to the influence of the jitter in the transfer time is reduced. Therefore, when the data is sound data of a real-time application, it is possible to reduce the occurrence of sound interruption due to discarding of the data. Hence, when the present invention is applied to a system such as an IP telephony system, since the occurrence of constant delay and sound interruption is reduced, it is possible to provide high-quality communication.

Moreover, according to the present invention, the accumulated state of the data accumulated in the accumulating unit is checked at a predetermined check interval, and when the accumulated amount of the data accumulated in the accumulating unit is not less than a predetermined reference amount as a basis for detecting a constant delay as a result of the check, a judgment is made that the constant delay has occurred, and a part of the data accumulated in the accumulating unit is discarded when such a judgment is made. With such a configuration of the present invention, it is possible to solve the constant delay.

In addition, according to the present invention, when a judgment is made that a non-accumulated state in which no data is accumulated in the accumulating unit has occurred, a further judgment is made as to whether or not discarding of the data based on the constant delay has occurred. When a judgment is made that the discarding of the data has occurred, the set period of the check interval is extended. According to such an invention, it is possible to prevent the initial accumulation amount and the upper accumulation amount from being inappropriately set due to oversight of jitter of long cycle. For example, with a prior art, when jitter of longer cycle than an initial check interval has occurred, even when the non-accumulated state occurs due to the jitter after the check, there is a possibility that the initial accumulation amount and the upper accumulation limit amount may be repeatedly set without taking into account the occurrence of the non-accumulated state. However, with the present invention, since the occurrence of the non-accumulated state due to jitter of long cycle is reduced by optimizing the check interval as described above, when the data is sound data of a real-time application, the occurrence of sound interruption due to discarding of the data is reduced. Hence, when the present invention is applied to a system such as an IP telephony system, it is possible to reduce the occurrence of constant delay and sound interruption and provide high-quality communication.

The above and further objects and features of the invention will more fully be apparent from the following detailed description with accompanying drawings.

BRIEF DESCRIPTION OF THE SEVERAL VIEWS OF THE DRAWINGS

FIG. 7 is a flowchart showing the procedure of an output process performed by the data output apparatus of Embodiment 1 of the present invention;

FIG. 9A and FIG. 9B are graphs showing a change with time in the accumulated amount of data in the data output apparatus of Embodiment 1 of the present invention;

FIG. 17 is a block diagram showing an example of the configuration of the data output apparatus of Embodiment 5 of the present invention.

DETAILED DESCRIPTION OF THE PRESENT INVENTION

The following description will explain in detail the present invention, based on the drawings illustrating preferred embodiments thereof.

Embodiment 1

Figure 1:
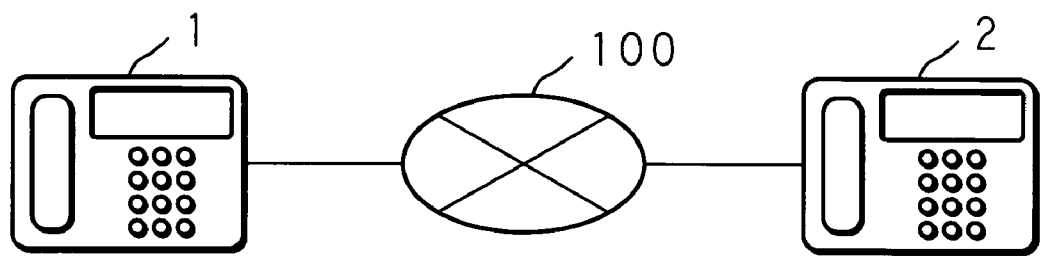
FIG. 1 is a schematic view showing conceptually an example of the configuration of a communication system using a data output apparatus of Embodiment 1 of the present invention.

FIG. 1 is a schematic view showing conceptually an example of the configuration of a communication system using a data output apparatus of Embodiment 1 of the present invention.

In FIG. 1, reference numeral 1 represents a data output apparatus of the present invention, and a computer for communication such as an IP telephony terminal apparatus is used. The data output apparatus 1 is connected to a communication network 100 such as a VoIP network composed of a relay apparatus such as an Internet router and communication lines, and performs packet communication with a transmitting apparatus 2 such as an IP telephony terminal apparatus. The transmitting apparatus 2 generates packets including sound data for outputting inputted sound, and transmits the generated packets to the data output apparatus 1 through the communication network 100. The data output apparatus 1 outputs sound based on the sound data included in the packets received from the transmitting apparatus 2. The packets including sound data are based on standards such as RTP (Real-time Transport Protocol) that is a protocol for use in VoIP communication. Note that although the data output apparatus 1 and the transmitting apparatus 2 are explained as different apparatuses for the sake of explanation, the configurations of these two apparatuses are substantially the same, and they are not limited to one-way communication from the transmitting apparatus 2 to the data output apparatus 1 and are able to perform interactive communication.

Figure 2:
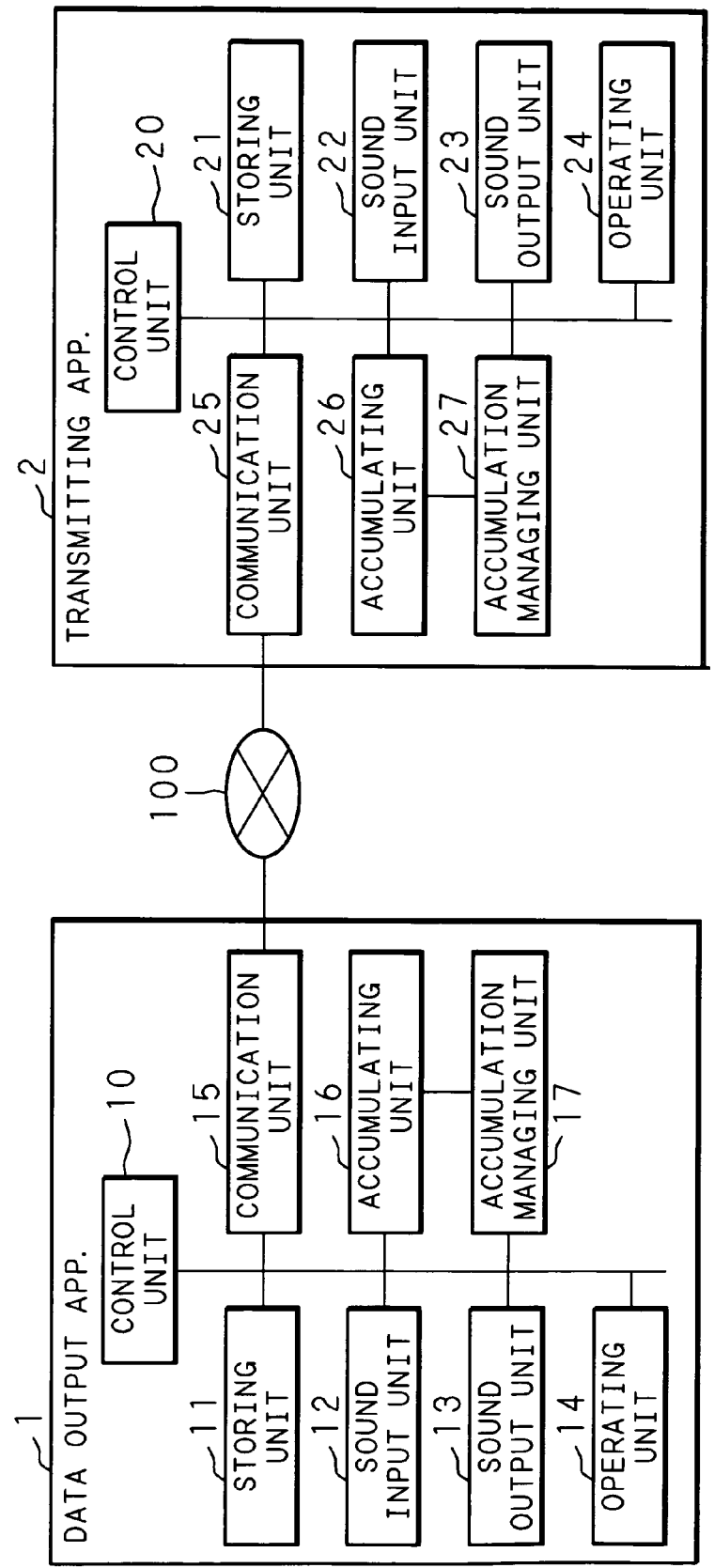
FIG. 2 is a block diagram showing an example of the internal configurations of various apparatuses such as the data output apparatus of Embodiment 1 of the present invention.

FIG. 2 is a block diagram showing an example of the internal configurations of various apparatuses used in the communication system of Embodiment 1 of the present invention.

The data output apparatus 1 comprises a control unit 10 for controlling the whole apparatus. Connected through a bus to the control unit 10 are various circuits including a storing unit 11 composed of volatile and non-volatile memory for storing various types of information such as computer programs and data, a sound input unit 12 such as a microphone for receiving input of sound, a sound output unit 13 such as a speaker for outputting sound, an operating unit 14 including various push buttons, a communication unit 15 to be connected to the communication network 100, an accumulating unit 16 for use as a communication buffer, and an accumulation managing unit 17 for controlling the accumulation of data in the accumulating unit 16.

The data output apparatus 1, under the control of the control unit 10, converts sound received as an input of analog data from the sound input unit 12 into digital data, divides the sound data in the form of digital data into a predetermined data length, and transmits the data as packets from the communication unit 15 to the communication network 100. Moreover, the data output apparatus 1, under the control of the control unit 10, receives packets including sound data by the communication unit 15 from the communication network 100, and temporarily accumulates the sound data included in the received packets in the accumulating unit 16. The sound data accumulated in the accumulating unit 16 is converted into analog data and outputted as sound from the sound output unit 13 at a predetermined time interval set as an output interval.

The transmitting apparatus 2 comprises various circuits including a control unit 20, a storing unit 21, a sound input unit 22, a sound output unit 23, an operating unit 24, a communication unit 25, an accumulating unit 26, and an accumulation managing unit 27, and is basically configured in the same manner as the above-described data output apparatus 1.

Figure 3:
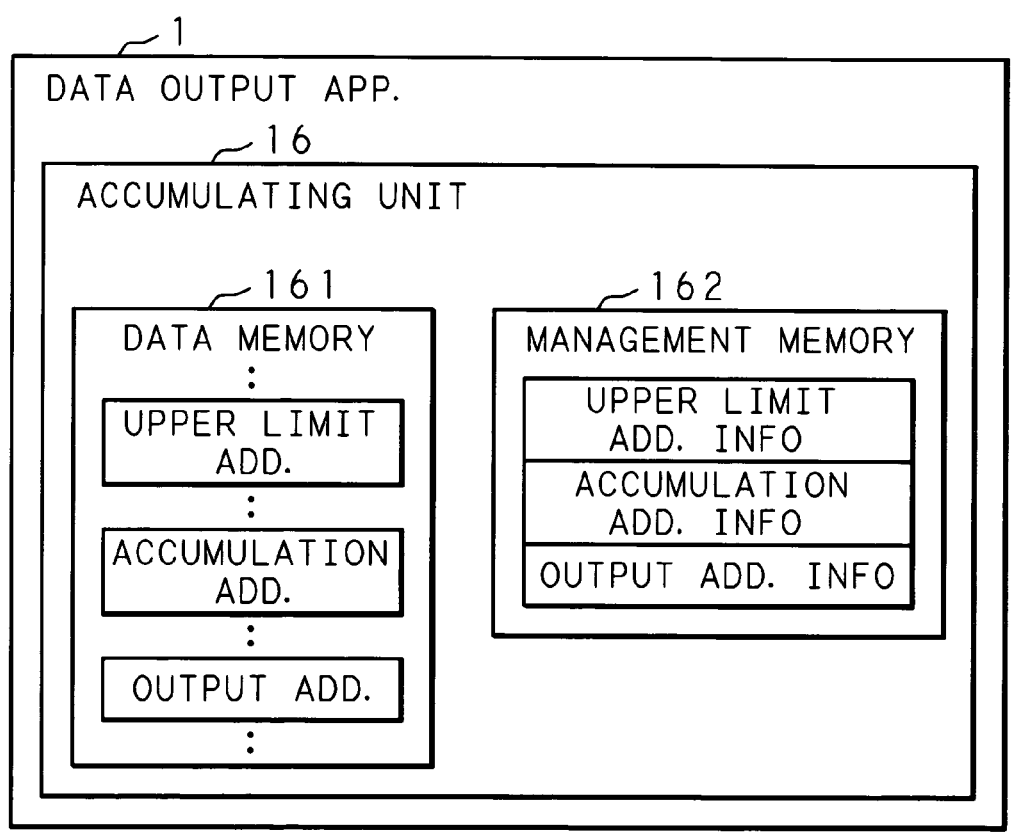
FIG. 3 is a block diagram showing an example of the functional configuration of an accumulating unit of the data output apparatus of Embodiment 1 of the present invention.

FIG. 3 is a block diagram showing an example of the functional configuration of the accumulating unit 16 of the data output apparatus 1 of Embodiment 1 of the present invention. The accumulating unit 16 has a data memory 161 for accumulating sound data included in the received packets, and a management memory 162 for use in managing the sound data accumulated in the data memory 161.

The management memory 162 stores output address information indicating an output address showing a location up to which output of sound data accumulated in the data memory 161 to the sound output unit 13 has been completed; accumulation address information indicating an accumulation address showing a location up to which the sound data has been accumulated; and an upper limit address information indicating an upper limit address showing a location up to which data can be accumulated.

The sound data included in the packets received by the communication unit 15 is started to be accumulated from the location indicated by the accumulation address information in the data memory 161, and the accumulation address information is updated according to the amount of accumulated data. However, when data is accumulated and the location indicated by the accumulation address information exceeds the location indicated by the upper limit address information, the data is accumulated in the data memory 161 up to the location indicated by the upper limit address information, but the excess of data is discarded.

When output to the sound output unit 13 has been completed, the output address information is updated to an address indicating the location at which output has been completed, and the upper limit address information is also updated according to the updated output address information. In other words, in the data memory 161, the range from the location indicated by the output address information to the location indicated by the upper limit address information is constant, and the amount of data accumulated based on the addresses within this range will be the upper limit of the accumulated amount of data in the data memory 161, that is, the upper limit of the accumulated amount of data in the data output apparatus 1.

Note that when the location indicated by the upper limit address information exceeds the end of the data memory 161, the location indicated by the upper limit address information becomes the start address of the data memory 161. The same thing can also be said for the accumulation address information and the output address information. In short, the data memory 161 is a virtual ring-structured memory.

Figure 4:
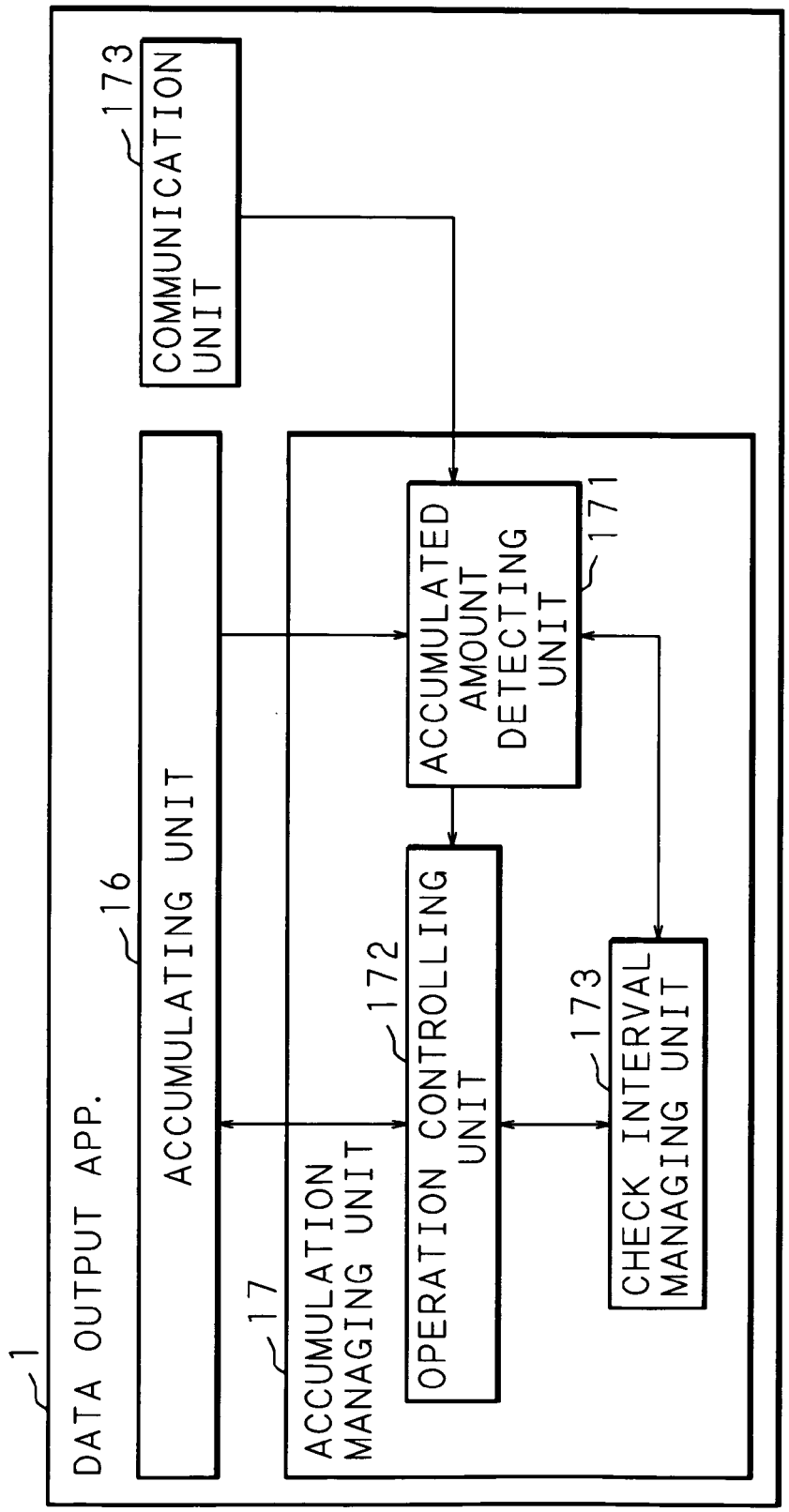
FIG. 4 is a block diagram showing an example of the functional configuration of an accumulation managing unit of the data output apparatus of Embodiment 1 of the present invention.

FIG. 4 is a block diagram showing an example of the functional configuration of the accumulation managing unit 17 of the data output apparatus 1 of Embodiment 1 of the present invention.

The accumulation managing unit 17 comprises modules composed of hardware and software, such as an accumulated amount detecting unit 171 for detecting the amount of sound data that has not yet been outputted and has been accumulated in the accumulating unit 16 based on the output address information and the accumulation address information; an operation controlling unit 172 for controlling the operation relating to the accumulation in the accumulating unit 16 based on the data amount detected by the accumulated amount detecting unit 171; and a check interval managing unit 173 for managing the time interval of checking the accumulation state of sound data by the accumulated amount detecting unit 171.

As parameters necessary for management, the accumulated amount detecting unit 171 stores various data, such as a minimum accumulated amount indicating the minimum value of the accumulated amount of sound data accumulated in the accumulating unit 16, and a constant delay reference amount as a basis for detecting a later-described constant delay. Moreover, the accumulated amount detecting unit 171 outputs the detected accumulated amount of sound data in the accumulating unit 16 to the operation controlling unit 172. Further, the accumulated amount detecting unit 171 compares the detected accumulated amount with the stored minimum accumulated amount, and updates the value shown by the minimum accumulated amount when the detected accumulated amount is less than the minimum accumulated amount.

In addition, when the accumulated amount detecting unit 171 detects the reception of sound data in the form of packets, it outputs a signal indicating this fact to the check interval managing unit 173 and receives a signal indicating that it is the time point to detect the constant delay from the check interval managing unit 173.

Further, the accumulated amount detecting unit 171 manages an overflow flag indicating whether or not the accumulated amount of sound data accumulated in the accumulating unit 16 has reached an upper limit value, based on the detected accumulated amount of sound data in the accumulating unit 16, and a discard flag indicating whether or not discarding of sound data based on the later-described constant delay has occurred. When the overflow flag is "0", it means that the accumulated amount of sound data has not reached the upper limit value. When the overflow flag is "1", it means that the accumulated amount of sound data has reached the upper limit value. When the discard flag is "0", it means that discarding of sound data based on the constant delay has not occurred. When the discard flag is "1", it means that discarding of sound data based on the constant delay has occurred.

As parameters necessary for control, the operation controlling unit 172 stores various data, such as an initial accumulation amount indicating a reference data location for starting to output the sound data accumulated in the accumulating unit 16, and an upper accumulation limit amount indicating an upper limit value of sound data to be accumulated in the accumulating unit 16.

As parameters necessary for managing the check interval, the check interval managing unit 173 stores various data, such as a reception counter for counting the number of received packets, a set period of the check interval, an upper limit value of the check interval, and an additional duration for extending the check interval. Moreover, when the check interval managing unit 173 receives a signal indicating the reception of a sound data in the form of packet from the accumulated amount detecting unit 171, it increments the value of the reception counter by "1".

Further, when the value of the reception counter reaches the set value of check interval, the check interval managing unit 173 outputs a signal indicating that it is the time point to detect the constant delay to the accumulated amount detecting unit 171 and initializes the value of the reception counter to "0".

The basic operation of the above-mentioned accumulation managing unit 17 is as follows. When the data output apparatus 1 starts communication, the sound data included in packets received by the communication unit 15 is accumulated in the accumulating unit 16. Then, the accumulated amount detecting unit 171 detects the accumulated data amount, and outputs information showing the detected data amount to the operation controlling unit 172. When the operation controlling unit 172 judges, based on the information received from the accumulated amount detecting unit 171, that the data amount has reached the initial accumulation value, it starts outputting the sound data accumulated in the accumulating unit 16. Moreover, the operation controlling unit 172 sets the upper limit address information of the data memory 161 of the accumulating unit 16, based on the accumulation upper limit amount.

Next, the relationship between the accumulated amount in the accumulating unit 16 managed by the accumulation managing unit 17 and a delay will be explained.

Figure 5:
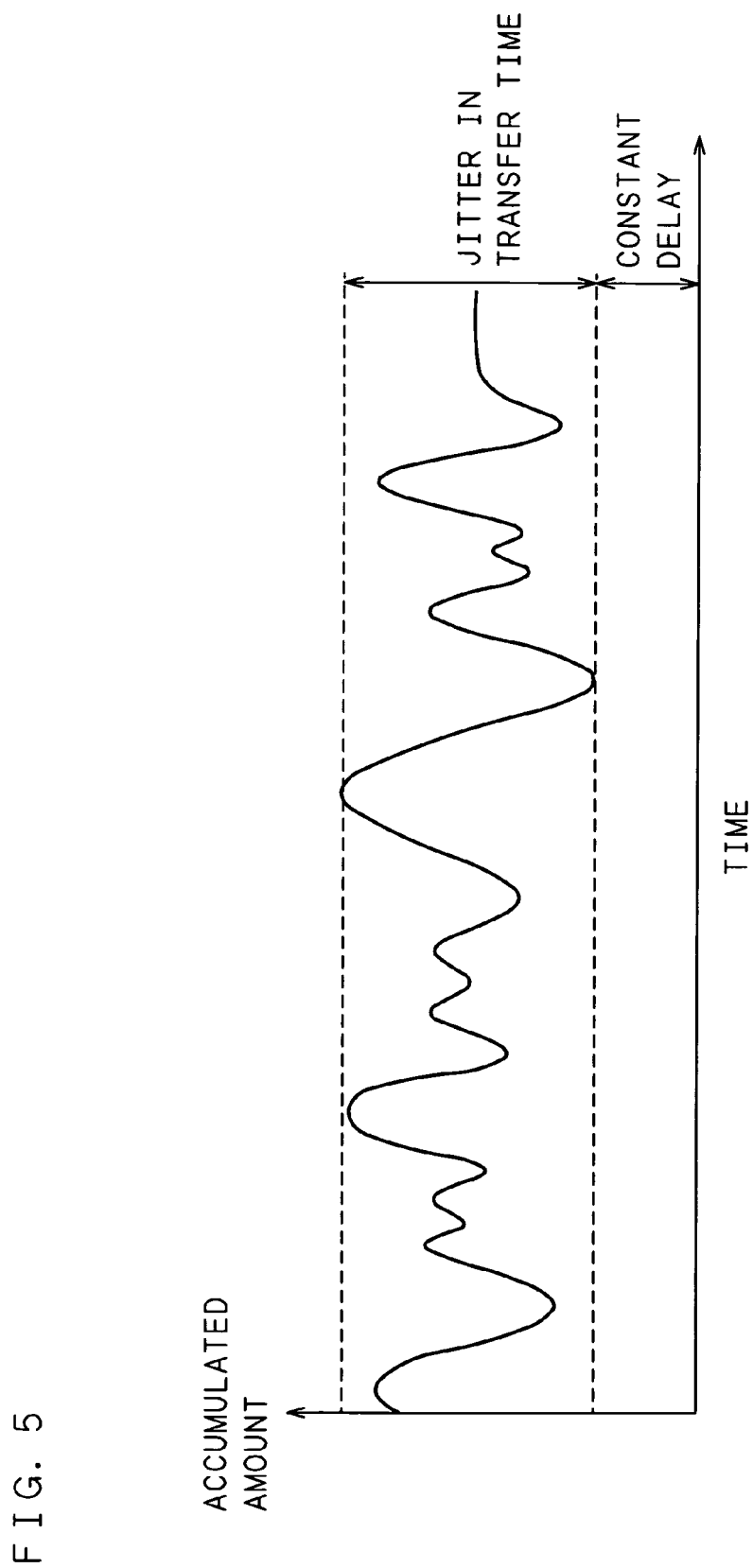
FIG. 5 is a graph showing a change with time in the accumulated amount of sound data in the data output apparatus of Embodiment 1 of the present invention.

FIG. 5 is a graph showing an example of a change with time in the accumulated amount of sound data in the data output apparatus 1 of Embodiment 1 of the present invention. FIG. 5 shows the relationship by plotting time in the axis of abscissas and the accumulated amount in the axis of ordinates. As shown in FIG. 5, the accumulated amount of sound data in the accumulating unit always changes, and the content can be classified into an accumulated amount due to jitter in the transfer time that varies depending on the jitter in the communication state, and an accumulated amount due to constant delay that is accumulated constantly.

Therefore, the accumulating unit 16 needs a capacity capable of accumulating the sum of the accumulated amount due to constant delay and the accumulated amount due to jitter in the transfer time. For example, when the accumulation capacity of the accumulating unit 16 is decreased, when the jitter in the transfer time increases, the frequency of running out of sound data accumulated in the accumulating unit 16 for output becomes higher, and consequently the possibility of output interruption increases. Hence, it is necessary to ensure an appropriate accumulation capacity for the accumulating unit 16. However, since the accumulated amount due to constant delay may cause a fixed output delay, it is preferred to reduce the accumulated amount due to constant delay.

For the above-mentioned reasons, the data output apparatus 1 of the present invention checks the amount of constant delay in each check time point based on the check interval managed by the check interval managing unit 173, and reduces the output delay by discarding a part of the sound data accumulated in the accumulating unit 16 when a constant delay that cannot be ignored has occurred.

Figure 6A:
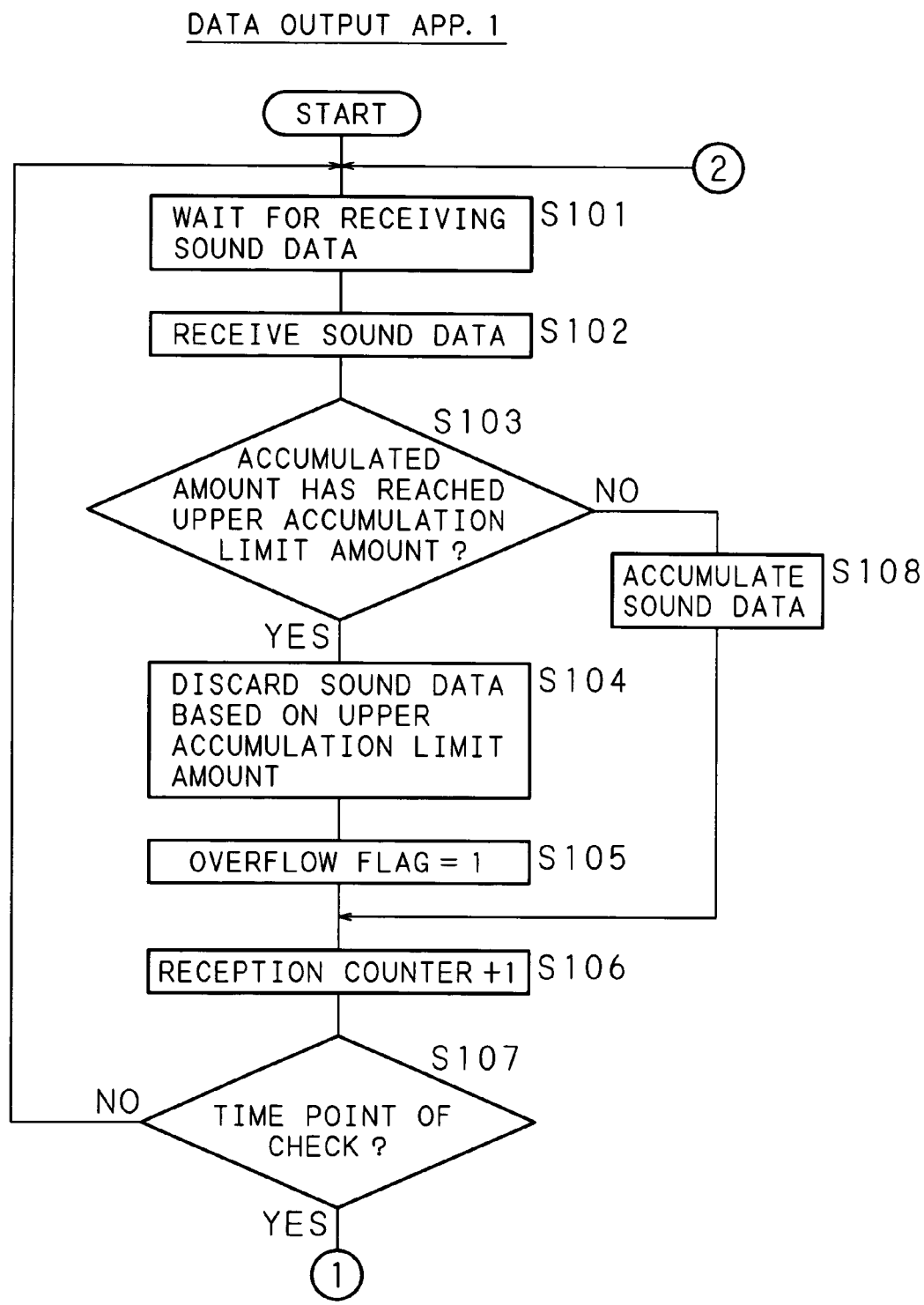
FIG. 6A and FIG. 6B are flowcharts showing the procedure of an accumulation process performed by the data output apparatus of Embodiment 1 of the present invention.
Figure 6B:
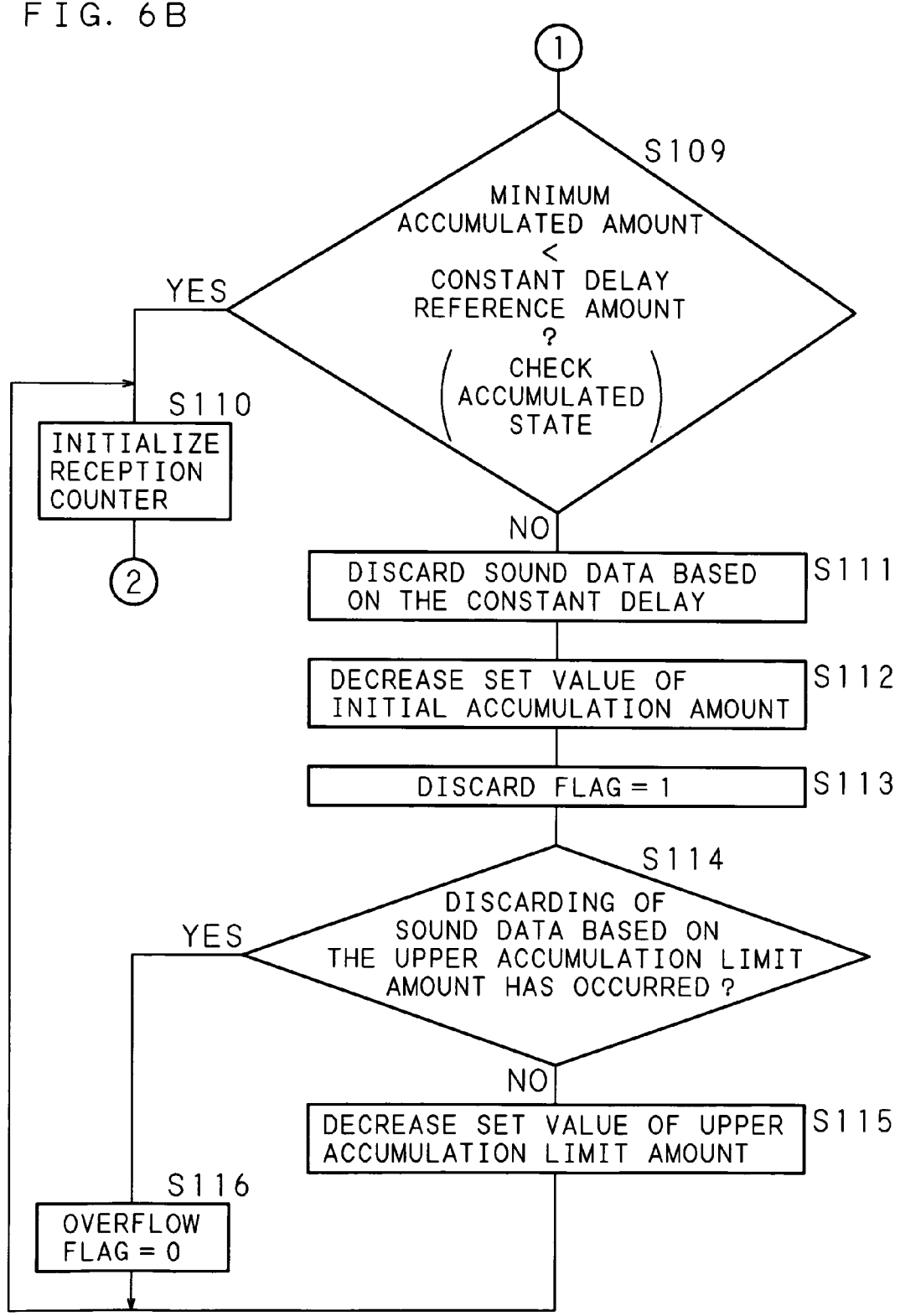

Next, the following description will explain the processes performed by the data output apparatus 1 of Embodiment 1 of the present invention. FIG. 6A and FIG. 6B are flowcharts showing the procedure of an accumulation process performed by the data output apparatus 1 of Embodiment 1 of the present invention. According to a computer program stored in the storing unit 11, the control unit 10 executes the process.

The control unit 10 of the data output apparatus 1 waits for receiving sound data in the form of a packet that is transmitted from the transmitting apparatus 2 through the communication network 100 (S101), and causes the communication unit 15 to receive the packet including sound data (S102). Then, the control unit 10 causes the accumulation managing unit 17 to judge whether or not the accumulated amount of sound data stored in the accumulating unit 16 has reached the upper accumulation limit amount (S103).

In step S103, when a judgment is made that the accumulated amount of sound data stored in the accumulating unit 106 has reached the upper accumulation limit amount (S103: YES), the control unit 10 discards the received sound data in the form of packet (S104), sets the overflow flag to "1" (S105), and increments the reception counter by "1" (S106). Then, by comparing the value of the reception counter with the set check interval, the control unit 10 judges whether or not it is the time point to perform a check based on the check interval (S107). When a judgment is made that it has not come to the time point to perform a check (S107: NO), the control unit 10 returns the process to step S101 and repeats the above-described processing to receive the next packet. Note that the judgment in step S107 is made by comparing the value of the reception counter with the value indicating the check interval.

In step S103, when a judgment is made that the accumulated amount of sound data stored in the accumulating unit 16 has not reached the upper accumulation limit amount (S103: NO), the control unit 10 accumulates the sound data included in the received packet in the accumulating unit 16 (S108), and proceeds the process to step S106 and executes the processing similar to the above.

In step S107, when a judgment is made that it is the time point to perform a check (S107: YES), the control unit 10 checks the accumulated state of sound data accumulated in the accumulating unit 16. More specifically, in a check period after the previous check, the control unit 10 judges whether or not the accumulated amount of sound data accumulated in the accumulating unit 16 is less than the constant delay reference amount (S109). The judgment in step S109 is made by comparing the minimum accumulated amount managed by the accumulated amount detecting unit 171 with the constant delay reference amount.

In step S109, when a judgment is made that the accumulated amount of sound data is less than the constant delay reference amount (S109: YES), the control unit 10 judges that a constant delay that cannot be ignored has not occurred. In this case, the control unit 10 initializes the reception counter (S110), and returns the process to step S101 and repeats the above-described processing to receive the next packet. Note that when the reception counter is initialized, the minimum accumulated amount indicating the minimum value of the accumulation amount in the check period is also initialized.

In step S109, when a judgment is made that the accumulated amount of sound data is not less than the constant delay reference amount (S109: NO), the control unit 10 judges that a constant delay that cannot be ignored has occurred. In this case, the control unit 10 discards a part of the sound data accumulated in the accumulating unit 16 (S111), decreases the set value of the initial accumulation amount according to the constant delay (S112), sets the discard flag to "1" (S113), and judges whether or not discarding of sound data based on the upper accumulation limit amount has occurred (S114). The judgment in step S114 is made based on the value of the overflow flag. Specifically, when the overflow flag is "1", the control unit 10 judges that discarding of sound data based on the upper accumulation limit amount has occurred in step S104. Whereas when the overflow flag is "0", the control unit 10 judges that discarding of sound data based on the upper accumulation limit amount has not occurred.

In step S114, when a judgment is made that discarding of sound data based on the upper accumulation limit amount has not occurred (S114: NO), the control unit 10 decreases the set value of the upper accumulation limit amount according to the constant delay (S115), and proceeds the process to step S110 and executes the processing similar to the above. Thus, when a judgment is made that a constant delay has occurred because the accumulated amount of sound data accumulated in the accumulating unit 16 is not less than a predetermined reference amount and when discarding of sound data based on the upper accumulation limit amount, that is, discarding of sound data due to overflow, has not occurred, the control unit 10 executes an optimization process for decreasing the set values of the initial accumulation amount and the upper accumulation limit amount so as to reduce the occurrence of constant delay.

In step S114, when a judgment is made that discarding of sound data based on the upper accumulation limit amount has occurred (S114: YES), the control unit 10 sets the overflow flag to "0" (S116), and proceeds the process to step S110 and executes processing similar to the above. Thus, when a judgment is made that the constant delay has occurred because the accumulated amount of sound data accumulated in the accumulating unit 16 is not less than the predetermined reference amount and when discarding of sound data based on the upper accumulation limit amount, that is, discarding of sound data due to overflow, has occurred, the control unit 10 judges that the constant delay has occurred and jitter in the transfer time is also large. In this case, by decreasing only the set value of the initial accumulation amount, the control unit 10 not only reduces the occurrence of constant delay, but also executes the optimization process for reducing the occurrence of discarding of sound data due to jitter in the transfer time.

FIG. 7 is a flowchart showing the procedure of an output process performed by the data output apparatus 1 of Embodiment 1 of the present invention. According to a computer program stored in the storing unit 11, the control unit 10 executes the output process.

After starting communication or after stopping sound reproduction based on sound data, when the accumulated amount of sound data accumulated in the accumulating unit 16 reaches the initial accumulation amount, the control unit 10 of the data output apparatus 1 starts the output process. At a predetermined time interval set as an output interval, the control unit 10 judges whether or not there is an accumulation of sound data that has not yet been outputted in the accumulating unit 16 (S201). When a judgment is made that there is an accumulation of sound data that has not yet been outputted in the accumulating unit 16 (S201: YES), the control unit 10 outputs the sound data accumulated in the accumulating unit 16 to the sound output unit 13 in the order in which the sound data was accumulated, and causes the sound output unit 13 to reproduce (output) sound based on the sound data (S202). Then, the control unit 10 returns the process to step S201 and repeats the above-described processing.

In step S201, when a judgment is made that there is no accumulation of sound data that has not yet been outputted in the accumulating unit 16 (S201: NO), the control unit 10 judges whether or not discarding of sound data has occurred (S203). The judgment in step S203 is made based on the value of the discard flag. Specifically, when the discard flag is "1", the control unit 10 judges that a constant delay has occurred, based on the constant delay reference amount, in step S111 of the accumulation process, and then judges that discarding of sound data has occurred. Whereas when the discard flag is "0", the control unit 10 judges that discarding of sound data based on the constant delay reference amount has not occurred.

In step S203, when a judgment is made that discarding of sound data has not occurred (S203: NO), the control unit 10 stops the reproduction (output) of sound based on sound data (S204), and terminates the output process. Note that when the accumulated amount of sound data accumulated in the accumulating unit 16 reaches the initial accumulation amount again after stopping the reproduction of sound, the control unit 10 resumes the processing from step S201.

In step S203, when a judgment is made that discarding of sound data has occurred (S203: YES), the control unit 10 sets the discard flag to "0" (S205), and compares the set period of the check interval with a preset upper limit value of the check interval (S206). When a judgment is made that the set period of the check interval is less than the upper limit value of the check interval (S206: YES), the control unit 10 extends the set period of the check interval by a preset predetermined additional duration (S207), and proceeds the process to step S207 and executes the subsequent processing. Thus, when the non-accumulated state occurred and sound data was discarded based on a judgment that the constant delay occurred, the control unit 10 executes the optimization process of extending the set period of the check interval so as to reduce inappropriate settings of the initial accumulation amount and the upper accumulation limit amount due to jitter of long cycle in transfer time and the occurrence of discarding of sound data.

In step S206, when a judgment is made that the set period of the check interval is not less than the upper limit value of the check interval (S206: NO), the control unit 10 proceeds the process to step S204 and executes the subsequent processing. Since the upper limit value is set to the set period of the check interval, it is possible to prevent the check interval from being extended more than necessary.

Figure 8:
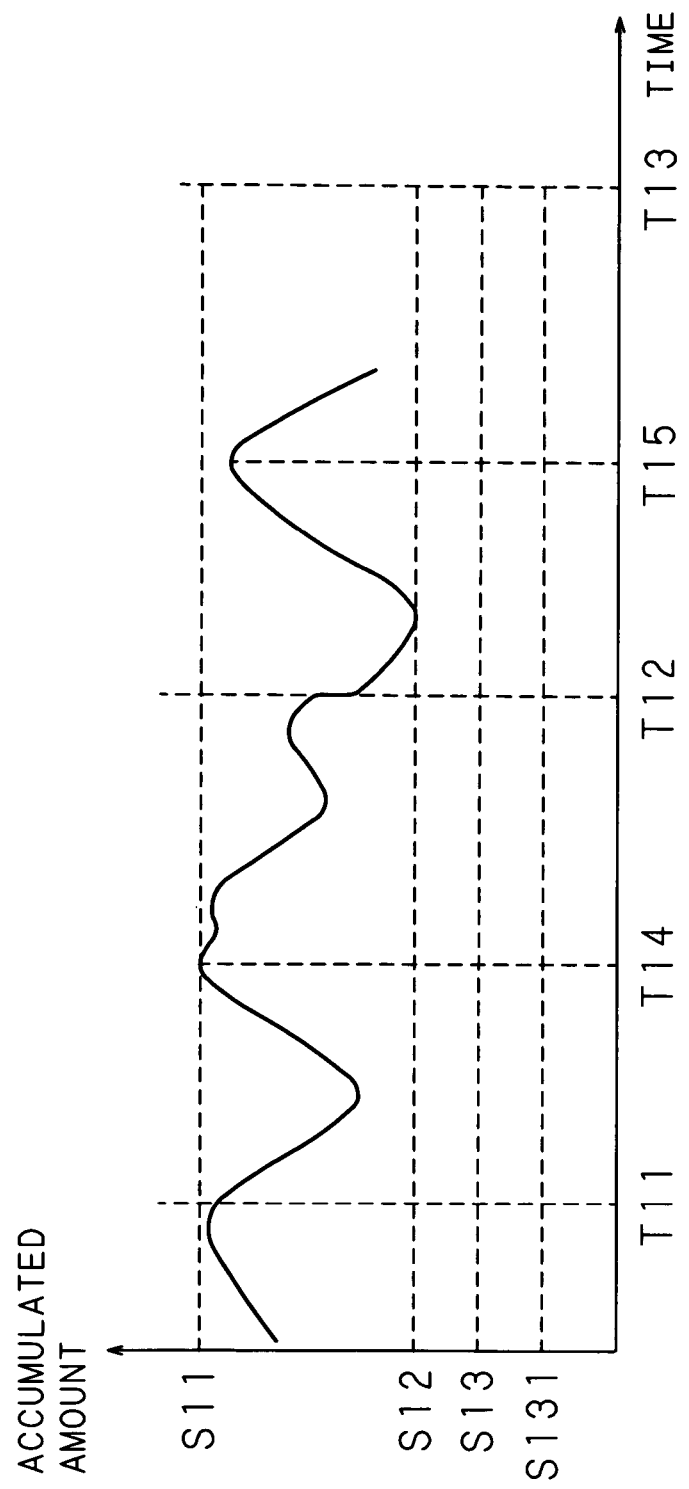
FIG. 8 is a graph showing a change with time in the accumulated amount of data in the data output apparatus of Embodiment 1 of the present invention.

Next, the following description will explain an example of the output state of data from the data output apparatus 1 of Embodiment 1 of the present invention. FIG. 8 is a graph showing a change with time in the accumulated amount of data in the data output apparatus 1 of Embodiment 1 of the present invention.

In FIG. 8, the axis of abscissas indicates time and the axis of ordinates indicates the accumulated amount of data to show their relationship. Moreover, S11, S12 and S13 shown in the axis of ordinates represent the upper accumulation limit amount, the constant delay reference amount, and the initial accumulation amount, respectively. The data output apparatus 1 reproduces sound as described above, based on the sound data accumulated in the accumulating unit 16, and checks the accumulated state of sound data at each of the time points T11, T12 and T13.

As shown in FIG. 8, in the check period from time point T11 to time point T12, the accumulated amount is always not less than the constant delay reference amount S12. Therefore, at time point T12, a part of the sound data is discarded, and the set value of the initial accumulation amount S13 is changed to S131. However, since the discarding of sound data based on overflow, namely the upper accumulation limit amount S11, occurs at time point T14, the set value of the upper accumulation amount S11 is not changed. At time point T12, since the set value of the initial accumulation amount S13 is decreased and changed to the initial accumulation amount S131, the occurrence of constant delay can be reduced. However, when the set value of the upper accumulated amount S11 is also changed, when jitter of the same level as time point T14 occurs at time point T15, there is a possibility that the packets may be discarded based on the changed upper accumulation limit amount of decreased set value. In Embodiment 1 of the present invention, since discarding of sound data based on the upper accumulation limit amount S11 occurs at time point T14, the set value of the upper accumulation limit amount S11 is not changed. Therefore, not only the occurrence of constant delay is reduced, but also the occurrence of discarding of sound data is reduced, and consequently the occurrence of sound interruption due to discarding of sound data is reduced.

FIG. 9A and FIG. 9B are graphs showing a change with time in the accumulated amount of data in the data output apparatus 1 of Embodiment 1 of the present invention. FIG. 9A shows an example in which the output process of Embodiment 1 of the present invention is applied, and FIG. 9B shows, for reference, an example in which the present invention is not applied. In FIG. 9A and FIG. 9B, the axis of abscissas indicates time and the axis of ordinates indicates the accumulated amount of data to show their relationship. Moreover, S21 shown in the axis of ordinates indicates the constant delay reference amount, and an assumption is made that the check interval is set to I21 at time point T21.

As shown in FIG. 9A, in the check period from time point T21 to time point T22, since the accumulated amount is always not less than the constant delay reference amount S21, a part of the sound data is discarded at time point T22. Subsequently, at time point T23, the non-accumulated state due to the discarding of sound data occurs, and sound interruption occurs. Then, based on the occurrence of the non-accumulated state at time point T23, the check period is extended from I21 to I22, and consequently the time point to check the accumulation state is changed from time point T24 to time point T25. Further, at time point T26, jitter of the same level as time point T23 occurs, but since the accumulated amount is less than the constant delay reference amount, the constant delay is not detected and therefore discarding of sound data and the non-accumulated state do not occur.

In FIG. 9B showing the state in which the extension of the check period as described in Embodiment 1 of the present invention was not performed and jitter similar to the jitter shown in FIG. 9A occurred, the state is similar to that shown in FIG. 9A until time point T22. However, at time point T22, the extension of the check period 121 is not performed. Further, in the check period from time point T24 to time point T27, since the accumulated amount is always not less than the constant delay reference amount S21, a part of the sound data is discarded at time point T27. Then, when jitter of the same level as time point T23 occurs at time point T26, a part of the sound data is discarded at time point T27, and therefore the non-accumulated state occurs and sound interruption occurs. Specifically, since the delay due to the jitter of long cycle was underestimated, inappropriate discarding of sound data was performed. Note that in the graph showing the change of the accumulated amount in FIG. 9B, the change indicated by the broken line is illustrated to show, for reference, the change when the method of the present invention was applied.

It is clear from the comparison between FIG. 9A and FIG. 9B that since the present invention can prevent inappropriate settings of the initial accumulation amount and the upper accumulation limit amount due to oversight of jitter of long cycle, the occurrence of discarding of sound data due to jitter of long cycle is reduced, and consequently the occurrence of sound interruption due to discarding of sound data is reduced.

Note that the various conditions shown in Embodiment 1 are merely one example, and they can be set suitably according to the system configuration, purposes, etc. For example, although Embodiment 1 described above illustrates a mode in which the check interval is set based on the number of received packets, the present invention is not limited to this and may be configured so that the check interval is set based on time.

Embodiment 2

According to Embodiment 2 of the present invention, in Embodiment 1 of the present invention described above, the additional duration for extending the check period is not fixed, and the additional duration for extending the check period is determined dynamically according to the occurrence of the non-accumulated state of sound data. However, since the configuration of a communication system using a data output apparatus of Embodiment 2 is basically the same as that of Embodiment 1, the explanation thereof will be omitted. In Embodiment 2, since the additional duration for extending the check period is not fixed, the check interval managing unit 173 does not need to store the additional duration for extending the check period as a parameter. However, the check interval managing unit 173 needs to store the time point at which the occurrence of constant delay was detected as described later.

Figure 10:
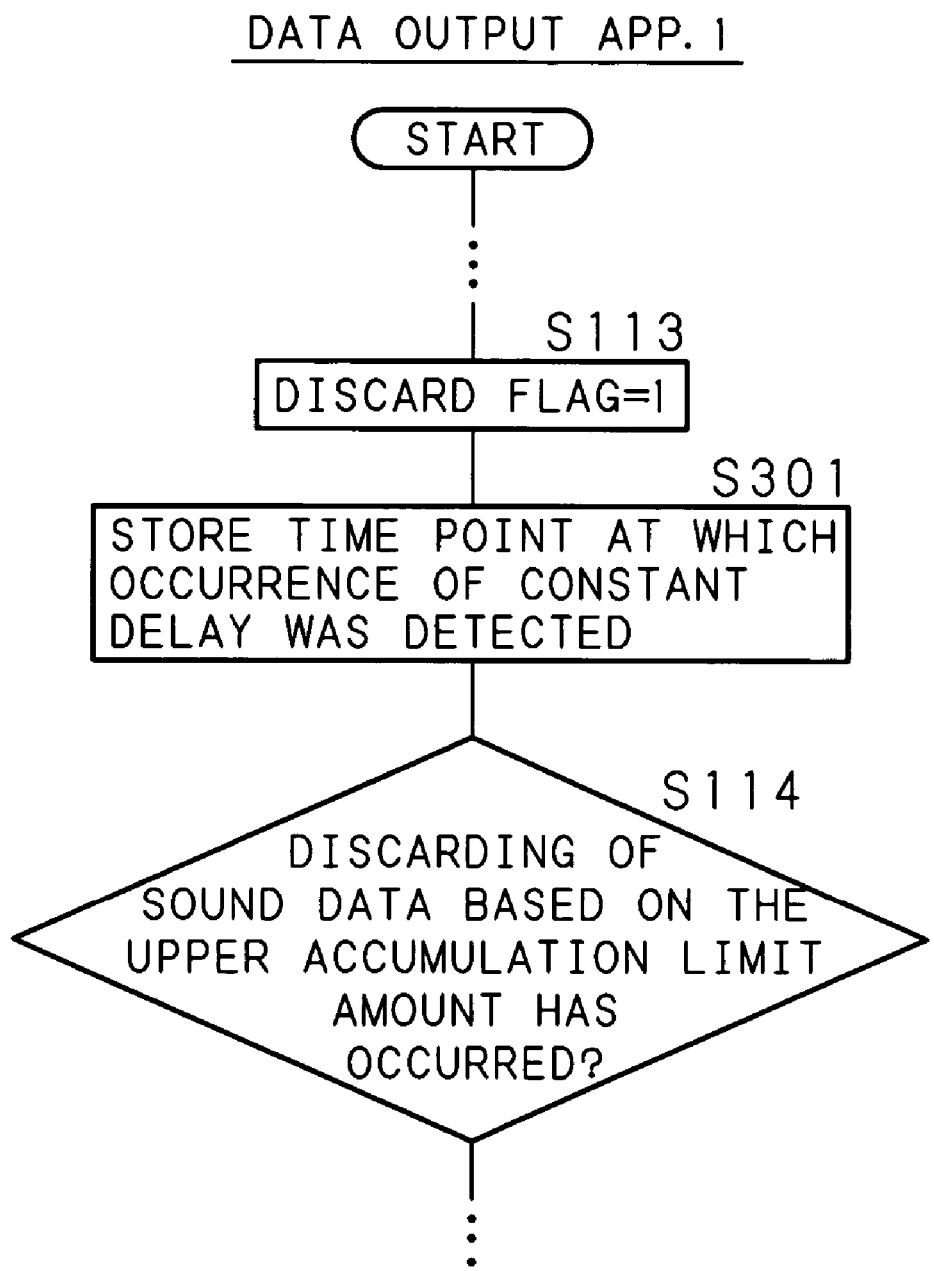
FIG. 10 is a flowchart showing a part of an accumulation process performed by a data output apparatus of Embodiment 2 of the present invention.

The following description will explain the processes performed by the data output apparatus 1 of Embodiment 2 of the present invention. FIG. 10 is a flowchart showing a part of an accumulation process performed by the data output apparatus 1 of Embodiment 2 of the present invention. According to a computer program stored in the storing unit 11, the control unit 10 executes the process.

Also, in the accumulation process of Embodiment 2, since the processing from the state of waiting to receive sound data in the form of packets transmitted from the transmitting apparatus 2 through the communication network 100, checking the accumulation state, discarding a part of the sound data accumulated in the accumulating unit 16 when a judgment is made that the constant delay has occurred, and setting the discarding flag to "1" is the same as the processing of steps S101 to S113 of Embodiment 1 of the present invention shown in FIG. 6A and FIG. 6B, the explanation thereof will be omitted.

The control unit 10 of the data output apparatus 1 sets the discard flag to "1" (S113), and then stores the time point at which the occurrence of constant delay was detected (S301). The occurrence of constant delay was detected in step S109 shown in FIG. 6A and FIG. 6B, and therefore, in step S301, the control unit 10 stores the current time as a constant delay detected time point at which the occurrence of constant delay was detected.

Since the processing after storing the constant delay detected time is the same as the processing shown in and after step S114 of Embodiment 1 in which a judgment is made as to whether or not discarding of sound data based on the upper accumulation limit amount has occurred, the explanation is omitted. Thus, in the accumulation process of Embodiment 2, when the occurrence of constant delay is detected, the process of storing the detected time by the control unit 10 is added.

Figure 11:
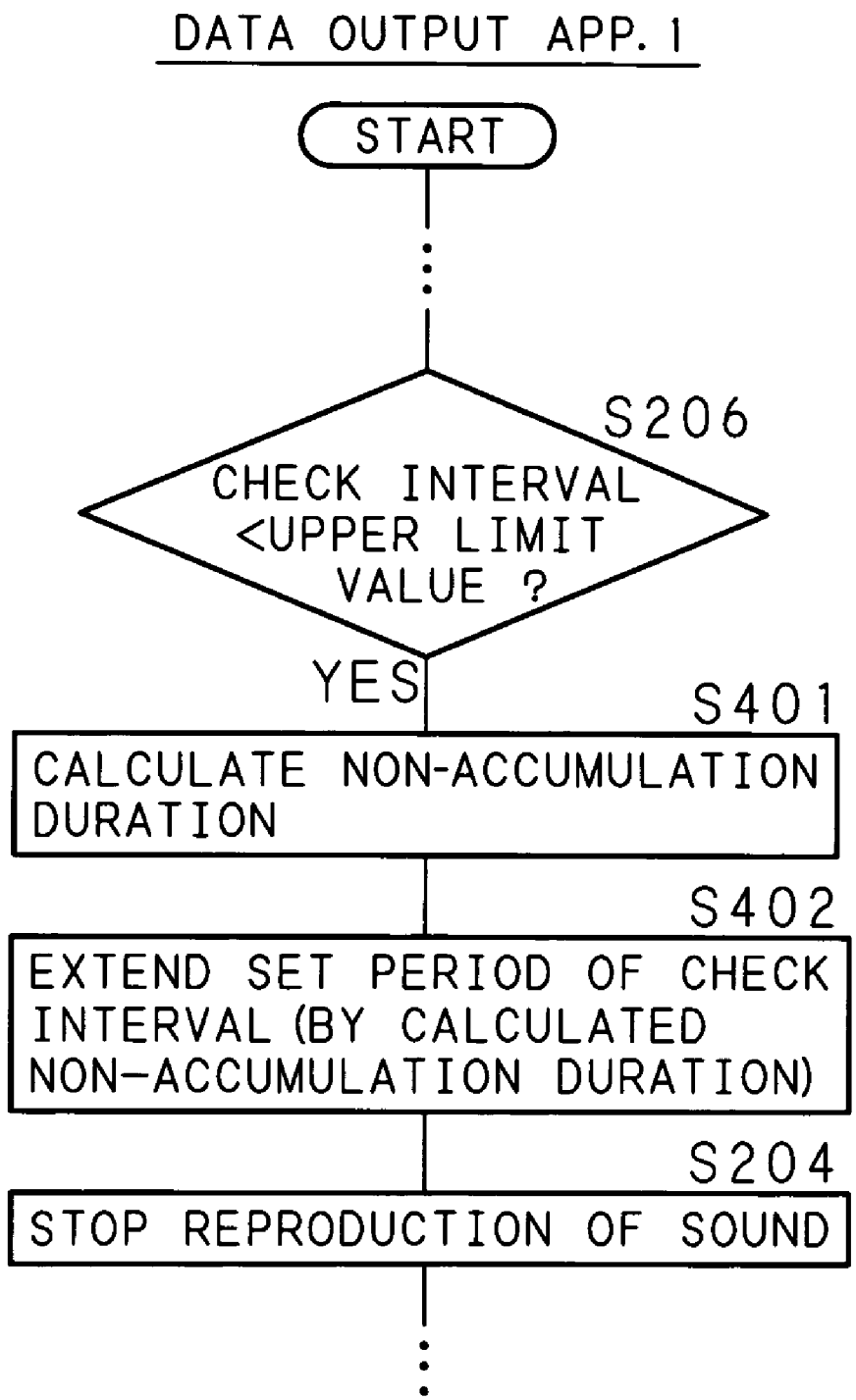
FIG. 11 is a flowchart showing a part of an output process performed by the data output apparatus of Embodiment 2 of the present invention.

FIG. 11 is a schematic view showing a part of an output process performed by the data output apparatus 1 of Embodiment 2 of the present invention. According to a computer program stored in the storing unit 11, the control unit 10 executes the process.

In the output process of Embodiment 2, since the processing from judging whether or not sound data has been accumulated in the accumulating unit 16, comparing the set period of the check interval with the upper limit value of the check interval when a judgment is made that sound data is in a non-accumulated state and has been discarded, and making a judgment that the set period of the check interval is less than the upper limit value of the check interval is the same as the processing from steps S201 to S206 of Embodiment 1 of the present invention shown in FIG. 7, the explanation is omitted.

When a judgment is made that the set period of the check interval is less than the upper limit value of the check interval (S206: YES), the control unit 10 calculates a non-accumulation duration from the constant delay detected time point to the time point of the occurrence of the non-accumulated state (S401), and extends the set period of the check interval by the calculated non-accumulation duration (S402). The occurrence of the non-accumulated state was detected in step S201 shown in FIG. 7, and therefore, in step S401, the control unit 10 calculates the non-accumulation duration by using the current time as the time point of the occurrence of the non-accumulated state and performing the operation of subtracting the constant delay detected time point from the time point of the occurrence of the non-accumulated state.

Since the processing after extending the set period of the check interval is the same as the processing shown in and after step S204 of Embodiment 1 in which the reproduction of sound based on sound data is stopped, the explanation is omitted. Thus, in the output process of Embodiment 2, the process of dynamically determining the additional duration for extending the check period according to the occurrence of the non-accumulated state is added. Hence, when jitter of long cycle has occurred, a check period according to the cycle of jitter is set. Since the additional duration for extending the check period is determined based on the difference between the time point of the occurrence of the non-accumulated state and the constant delay detected time point, when jitter of the same cycle occurs in and after the next time, it is also possible to decrease the possibility of erroneously detecting the jitter as the constant delay. It is therefore possible to avoid the occurrence of discarding of sound data based on the detection of constant delay, and a lowering of sound quality caused by the resulting non-accumulated state.

Note that the various conditions shown in Embodiment 2 are merely one example, and they can be set suitably according to the system configuration, purposes, etc.

Embodiment 3

According to Embodiment 3 of the present invention, in Embodiment 2 of the present invention described above, when the non-accumulated state of sound data occurs a plurality of times within one check period, the additional duration for extending the check period is determined according to the state of occurrence. However, since the configuration of a communication system using a data output apparatus of Embodiment 3 is basically the same as that of Embodiment 1, the explanation thereof will be omitted. In Embodiment 3, the check interval managing unit 173 manages the time point at which the occurrence of constant delay was detected and the time point of the occurrence of the non-accumulated state as the additional duration calculation reference time points to be used as the bases for calculating the additional duration.

The following description will explain the processes performed by the data output apparatus 1 of Embodiment 3 of the present invention.

Figure 12:
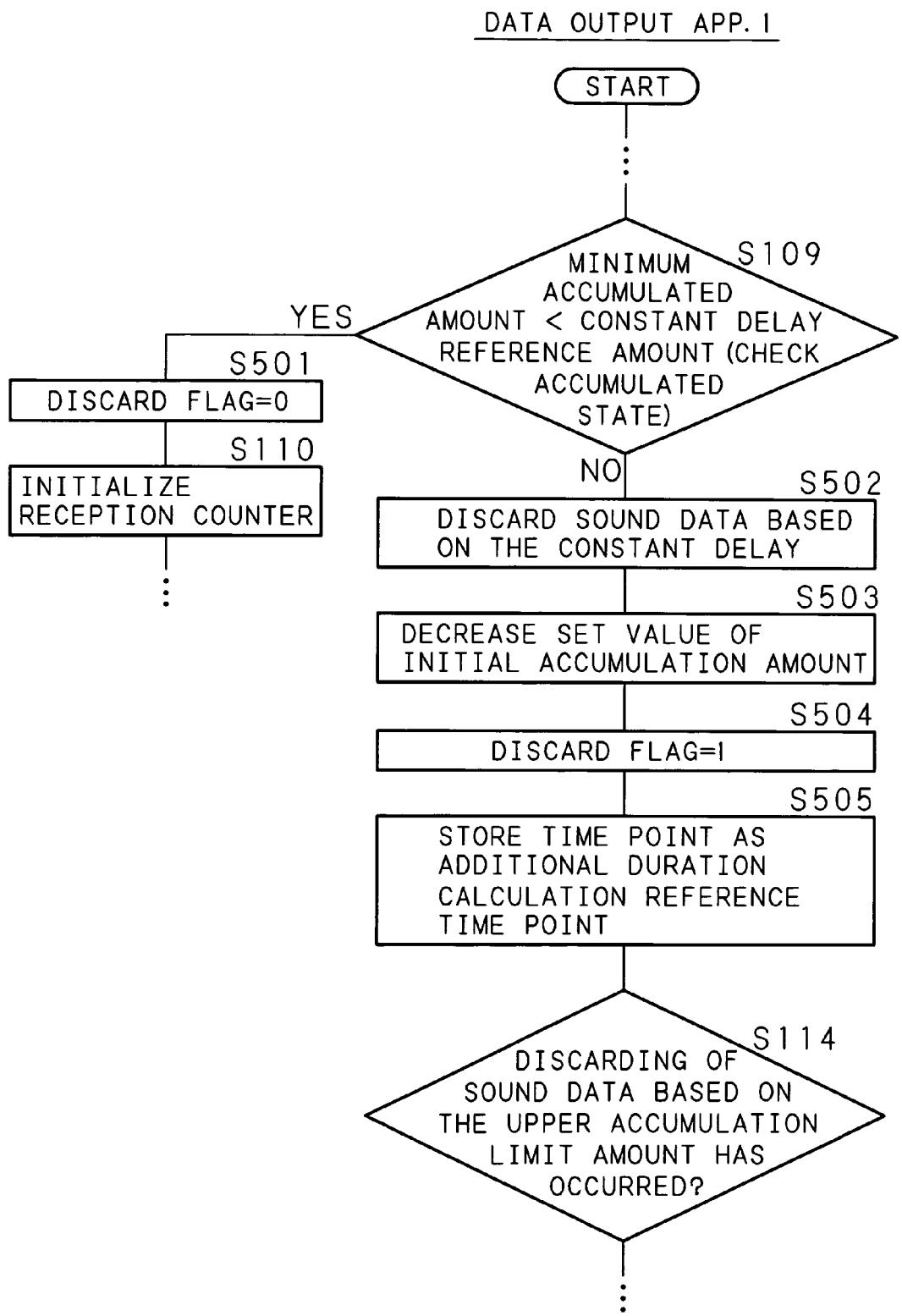
FIG. 12 is a flowchart showing a part of an accumulation process performed by a data output apparatus of Embodiment 3 of the present invention.

FIG. 12 is a flowchart showing a part of an accumulation process performed by the data output apparatus 1 of Embodiment 3 of the present invention. According to a computer program stored in the storing unit 11, the control unit 10 executes the process. Also, in the accumulation process of Embodiment 3, since the processing from the state of waiting to receive sound data in the form of packets transmitted from the transmitting apparatus 2 through the communication network 100 to checking the accumulation state is the same as the processing of steps S101 to S109 of Embodiment 1 of the present invention shown in FIG. 6A and FIG. 6B, the explanation is omitted.

In step S109, when a judgment is made that the accumulated amount of sound data is less than the constant delay reference amount (S109: YES), the control unit 10 of the data output apparatus 1 sets the discard flag to "0" (S501). In Embodiment 3 of the present invention, since the additional duration is determined according to a plurality of occurrences of the non-accumulated state, when the discard flag is set to "0" in a later-described output process, it is impossible to deal with the second and subsequent occurrences of the non-accumulated state. Therefore, the discard flag is set to "0" in the accumulation process.

Since the processing after setting the discard flag to "0" is the same as the processing shown in and after step S110 of Embodiment 1 in which the reception counter is initialized, the explanation is omitted.

In step S109, when a judgment is made that the accumulated amount of sound data is not less than the constant delay reference amount (S109: NO), the control unit 10 discards a part of the sound data accumulated in the accumulating unit 16 as the discarding of data based on the constant delay (S502), decreases the set value of the initial accumulation amount according to the constant delay (S503), sets the discard flag to "1" (S504), and stores the time point at which the occurrence of constant delay was detected as an additional duration calculation reference time point (S505). The occurrence of constant delay was detected in step S109, and therefore, in step S505, the control unit 10 stores the current time as the additional duration calculation reference time point.

Since the processing after storing the additional duration calculation reference time point is the same as the processing shown in and after step S114 of Embodiment 1 in which a judgment is made as to whether or not discarding of sound data based on the upper accumulation limit amount has occurred, the explanation is omitted. Thus, in the accumulation process of Embodiment 3, when the occurrence of constant delay is detected, the process of storing the detected time point as the additional duration calculation reference time point is added.

Figure 13:
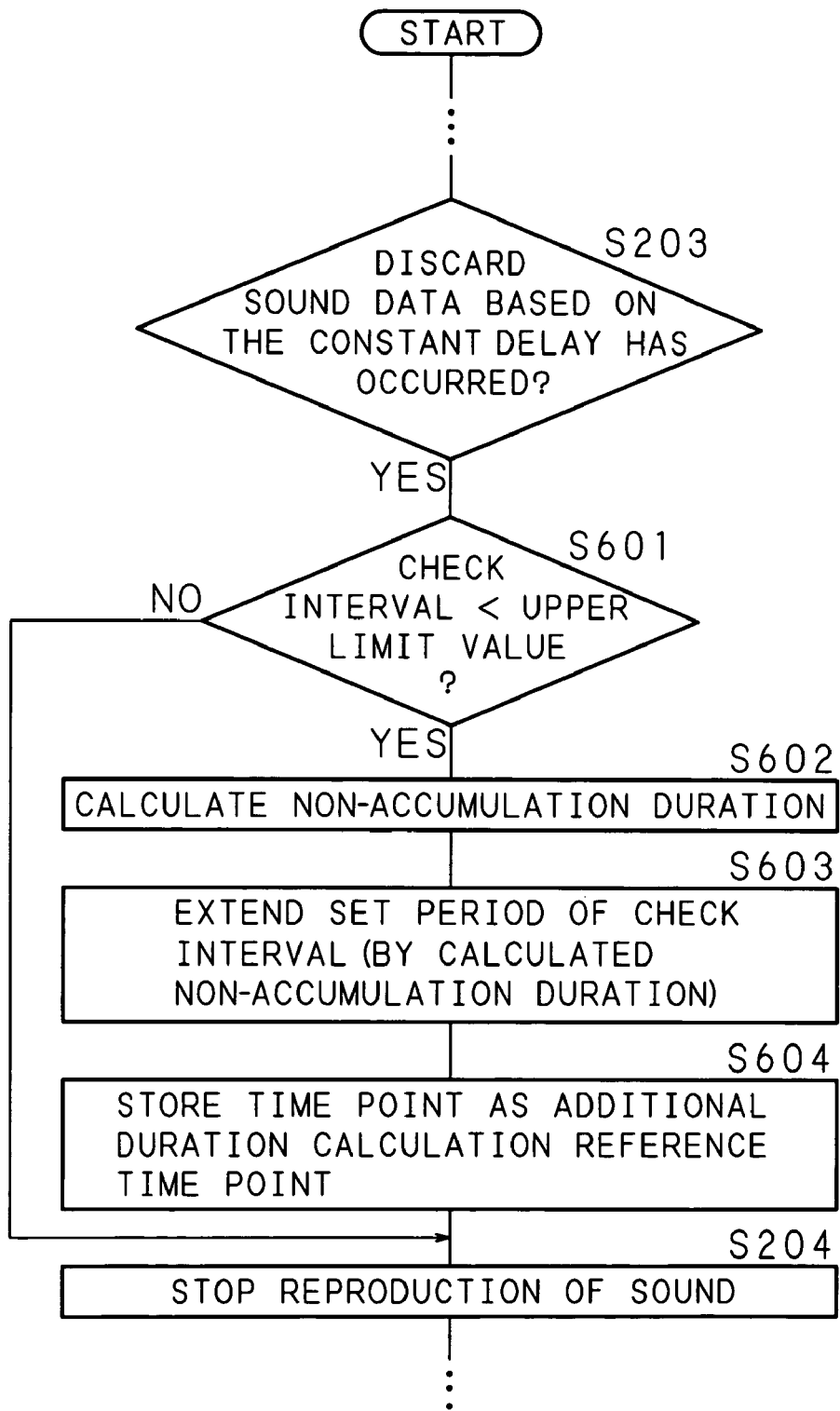
FIG. 13 is a flowchart showing a part of an output process performed by the data output apparatus of Embodiment 3 of the present invention.

FIG. 13 is a flowchart showing a part of an output process performed by the data output apparatus 1 of Embodiment 3 of the present invention. According to a computer program stored in the storing unit 11, the control unit 10 executes the process. In the output process of Embodiment 3, since the processing from judging whether or not sound data has been accumulated in the accumulating unit 16 to making a judgment that sound data is in a non-accumulated state and discarding of sound data has occurred is the same as the processing of steps S201 to S203 of Embodiment 1 of the present invention shown in FIG. 7, the explanation is omitted.

When a judgment is made that discarding of sound data based on the constant delay has occurred (S203: YES), the control unit 10 compares the set period of the check interval with the upper limit value of the check interval (S601). In Embodiment 3 of the present invention, since the process of setting the discard flag to "0" is performed in step S501 of the accumulation step as described above, the process of setting the discard flag to "0" is not performed in the output process.

In step S601, when a judgment is made that the set period of the check interval is less than the upper limit value of the check interval (S601: YES), the control unit 10 calculates a non-accumulation duration between the additional duration calculation reference time point and the current occurrence of the non-accumulated state (S602), extends the set period of the check interval by a period corresponding to the calculated non-accumulation duration (S603), and stores the time point at which the occurrence of the non-accumulated state was newly detected as the additional duration calculation reference time point (S604). Then, when this non-accumulated state is the first occurrence in this detection period, the additional duration calculation reference time point indicates the time point at which the constant delay was detected, which was stored in step S506 of the accumulation process. Whereas, when this non-accumulated state is not the first occurrence in this detection period, the additional duration calculation reference time point indicates the time point at which the previous occurrence of the non-accumulated state was detected.

Thus, in Embodiment 3 of the present invention, when the non-accumulated state occurred a plurality of times, the duration between the respective time points at which the non-accumulated state was detected is calculated as the non-accumulation duration in step S602, and the check interval is extended by only a period corresponding to the non-accumulation duration in step S603. Hence, the check interval is extended by only a period corresponding to the accumulation of the non-accumulation duration. Note that the occurrence of the non-accumulated state was detected in step S201 as described above, and therefore, in step S603, the calculation of subtracting the additional duration calculation reference time point from the time point of the occurrence of the non-accumulated state is performed by using the current time as the time of the occurrence of the non-accumulated state, and the non-accumulation duration is calculated as the result of the operation. Further, in step S604, the additional duration calculation reference time point is updated using the current time as the time point at which the occurrence of the non-accumulated state was detected.

Since the processing after storing the additional duration calculation reference time point is the same as the processing shown in and after step S204 of Embodiment 1 in which the reproduction of sound based on sound data is stopped, the explanation is omitted.

In step S601, when a judgment is made that the set period of the check interval is not less than the upper limit value of the check interval (S601: NO), the control unit 10 executes the processing similar to the processing shown in and after step S204 of Embodiment 1 in which the reproduction of sound based on sound data is stopped. Thus, when the non-accumulated state occurs a plurality of times within the check period, the additional duration for extending the check period is accumulated and determined, and therefore it is possible to deal with jitter of longer cycle. Specifically, even when jitter of longer cycle occurs, it is possible to decrease the possibility of erroneously detecting the jitter of longer cycle as the constant delay hereafter. Consequently, it is possible to avoid discarding of sound data based on the detection of constant delay, and a lowering of sound quality caused by the resulting occurrence of the non-accumulated state, etc.

Note that the various conditions shown in Embodiment 3 are merely one example, and they can be set suitably according to the system configuration, purposes, etc.

Embodiment 4

In Embodiment 4 of the present invention, when the non-accumulated state of sound data occurs a plurality of times within one check period, the additional duration for extending the check period is determined by a different method from that of Embodiment 3. More specifically, in Embodiment 4 of the present invention, the additional duration for extending the check period is determined based on the time point of the last occurrence of the non-accumulated state. However, since the configuration of a communication system using a data output apparatus of Embodiment 4 is basically the same as that of Embodiment 1, the explanation thereof will be omitted. In Embodiment 4, the check interval managing unit 173 manages the constant delay detected time point indicating the time point at which the occurrence of constant delay was detected, and the non-accumulation occurred time point indicating the time point of the occurrence of the non-accumulated state.

The following description will explain the processes performed by the data output apparatus 1 of Embodiment 4 of the present invention.

Figure 14:
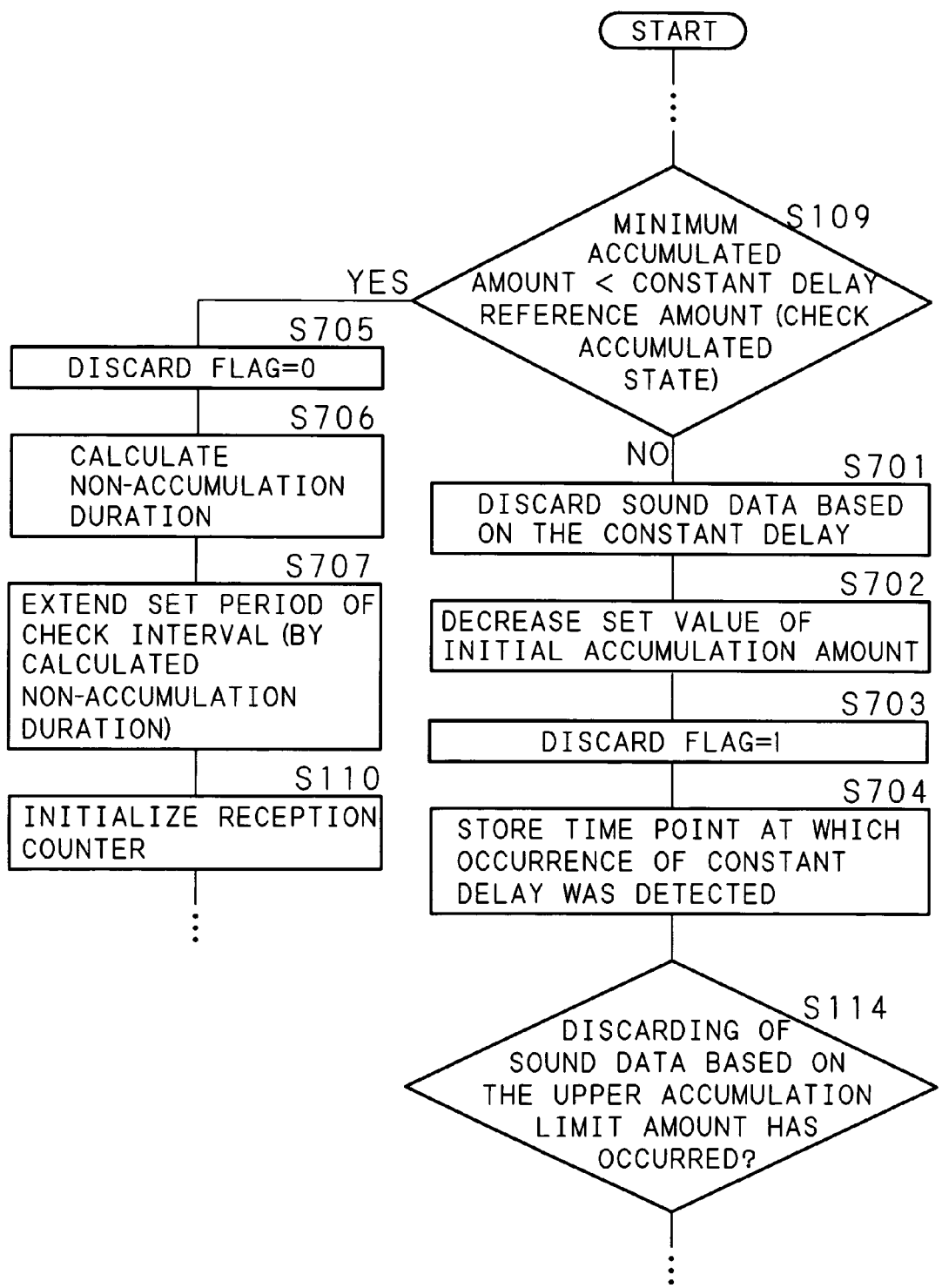
FIG. 14 is a flowchart showing a part of an accumulation process performed by a data output apparatus of Embodiment 4 of the present invention.

FIG. 14 is a flowchart showing a part of an accumulation process performed by the data output apparatus 1 of Embodiment 4 of the present invention. According to a computer program stored in the storing unit 11, the control unit 10 executes the process. Also, in the accumulation process of Embodiment 4, since the processing from the state of waiting to receive sound data in the form of packets transmitted from the transmitting apparatus 2 through the communication network 100 to checking the accumulation state is the same as the processing of steps S101 to S109 of Embodiment 1 of the present invention shown in FIG. 6A and FIG. 6B, the explanation thereof will be omitted.

In step S109, when a judgment is made that the accumulated amount of sound data is not less than the constant delay reference amount (S109: NO), the control unit 10 discards a part of the sound data accumulated in the accumulating unit 16 as the discarding of data based on the constant delay (S701), decreases the set value of the initial accumulation amount according to the constant delay (S702), sets the discard flag to "1" (S703), and stores the time point at which the occurrence of constant delay was detected (S704). The occurrence of constant delay was detected in step S109, and therefore, in step S704, the control unit 10 stores the current time as the constant delay detected time point at which the occurrence of constant delay was detected.

Since the processing after storing the constant delay detected time point is the same as the processing shown in and after step S114 of Embodiment 1 in which a judgment is made as to whether or not discarding of sound data based on the upper accumulation limit amount has occurred, the explanation is omitted.

In step S109, when a judgment is made that the accumulated amount of sound data is less than the constant delay reference amount (S109: YES), the control unit 10 sets the discard flag to "0" (S705), calculates the non-accumulation duration between the constant delay detected time point and the non-accumulation occurred time point (S706), and extends the set period of the check interval by only a period corresponding to the calculated non-accumulation duration (S707). The non-accumulation occurred time point for use in the calculating process of step S706 is the time point of the last occurrence of the non-accumulated state and is set by a later-descried output process. Thus, the non-accumulation duration calculated in step S706 is the time calculated as the difference between the constant delay detected time point indicating the time point at which the last constant delay was detected and the non-accumulation occurred time point indicating the time point of the last occurrence of the non-accumulated state.

Since the processing after extending the set period of the check interval is the same as the processing shown in and after step S110 of Embodiment 1 in which the reception counter is initialized, the explanation is omitted. Thus, in Embodiment 4, the process of extending the set period of the check interval is performed in the accumulation process.

Figure 15:
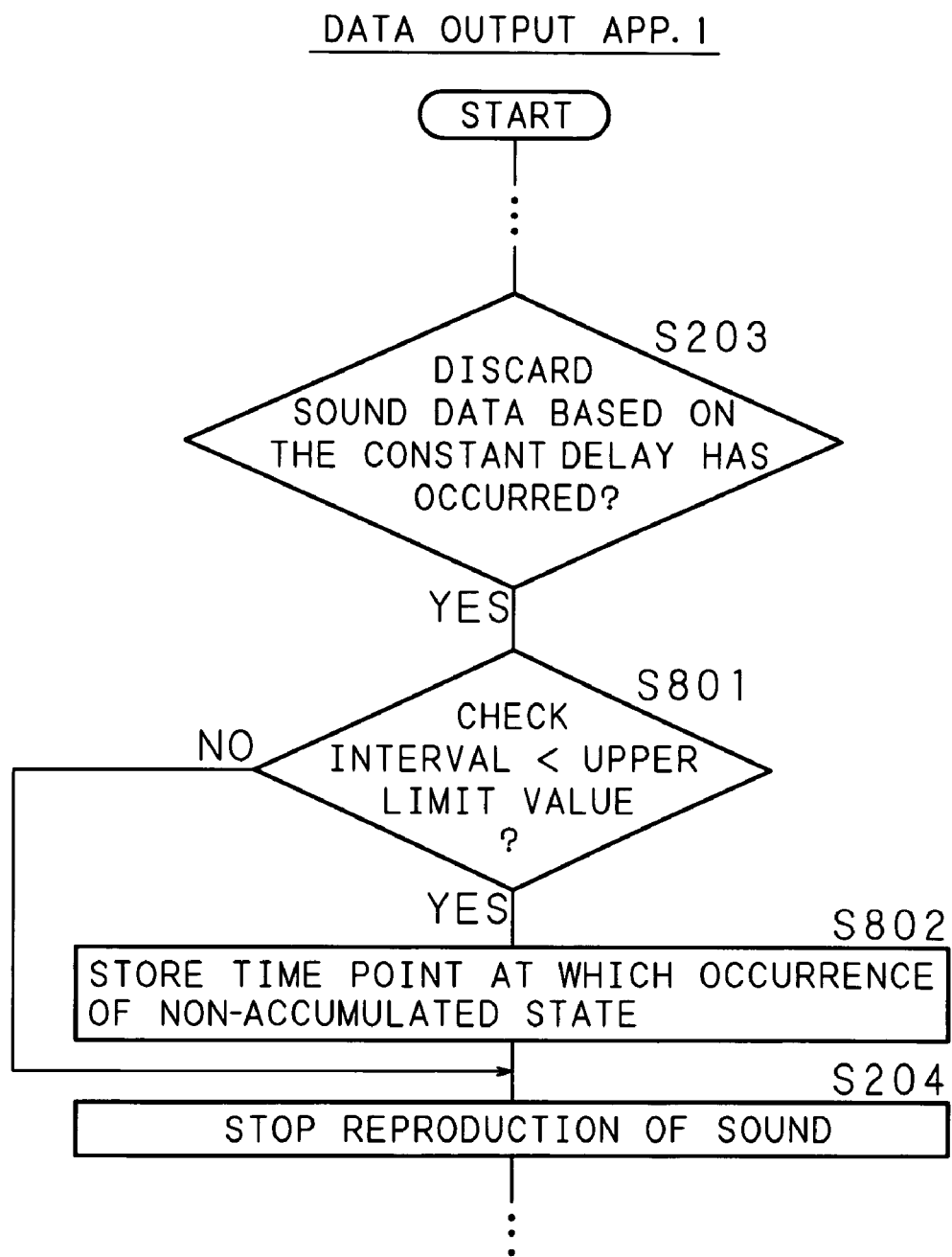
FIG. 15 is a flowchart showing a part of an output process performed by the data output apparatus of Embodiment 4 of the present invention.

FIG. 15 is a flowchart showing a part of an output process performed by the data output apparatus 1 of Embodiment 4 of the present invention. According to a computer program stored in the storing unit 11, the control unit 10 executes the process. Also, in the output process of Embodiment 4, since the processing from judging whether or not sound data has been accumulated in the accumulating unit 16 to making a judgment that sound data is in a non-accumulated state and discarding of sound data has occurred is the same as the processing of steps S201 to S203 of Embodiment 1 of the present invention shown in FIG. 7, the explanation is omitted.

When a judgment is made that discarding of sound data based on the constant delay has occurred (S203: YES), the control unit 10 compares the set period of the check interval with the upper limit value of the check interval (S801). When a judgment is made that the set period of the check interval is less than the upper limit value of the check interval (S801: YES), the control unit 10 stores the time point at which the occurrence of the non-accumulated state was detected as the non-accumulation occurred time point (S802). The occurrence of the non-accumulated state was detected in step S201, and therefore, in step S802, the control unit 10 stores the current time as the time point at which the occurrence of the non-accumulated state was detected. Note that the non-accumulation occurred time point is updated whenever the non-accumulated state occurs.

Since the processing after storing the non-accumulation occurred time point is the same as the processing shown in or after step S204 of Embodiment 1 in which the reproduction of sound based on sound data is stopped, the explanation is omitted.

In step S801, when a judgment is made that the set period of the check interval is not less than the upper limit value (S801: NO), the control unit 10 executes the processing similar to the processing shown in and after step S204 of Embodiment 1 in which the reproduction of sound based on sound data is stopped. Hence, when the non-accumulated state occurs a plurality of times within the check period, the additional duration for extending the check period is determined based on the difference between the time point of the last occurrence of the non-accumulated state and the constant delay detected time point, and therefore it is possible to deal with jitter of longer cycle. Specifically, even when jitter of longer cycle occurs, it is possible to decrease the frequency of erroneously detecting the jitter of longer cycle as the constant delay hereafter. Consequently, it is possible to avoid discarding of sound data based on the detection of constant delay, and a lowering of sound quality caused by the resulting occurrence of the non-accumulated state, etc.

Note that the various conditions shown in Embodiment 4 are merely one example, and they can be set suitably according to the system configuration, purposes, etc.

Embodiment 5

Figure 16:
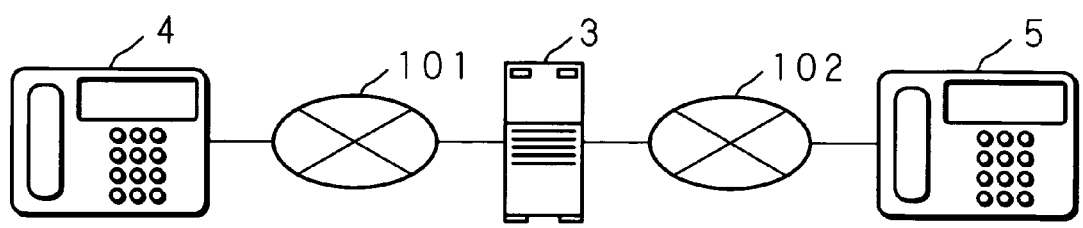
FIG. 16 is a schematic view showing an example of the conceptual configuration of a communication system using a data output apparatus of Embodiment 5 of the present invention.

FIG. 16 is a schematic view showing an example of the conceptual configuration of a communication system using a data output apparatus of Embodiment 5 of the present invention.

In FIG. 16, reference numeral 3 represents the data output apparatus of Embodiment 5 of the present invention, and a computer for communication for use as a relay apparatus, such as an Internet router, is used. The data output apparatus 3 is connected to a first communication network 101 and a second communication network 102 such as VoIP network, and performs packet communication with a transmitting apparatus 4 such as an IP telephony terminal apparatus connected to the first communication network 101 and a receiving apparatus 5 such as an IP telephony terminal apparatus connected to the second communication network 102. The transmitting apparatus 4 generates packets including sound data for outputting the inputted sound, and transmits the generated packets to the data output apparatus 3 through the first communication network 101. The data output apparatus 3 transmits (outputs) the received packets to the receiving apparatus 5 through the second communication network 102. Then, the receiving apparatus 5 outputs sound based on the sound data included in the received packets. Note that although the transmitting apparatus 4 and the receiving apparatus 5 are described as different apparatuses for the sake of explanation, the configurations of these two apparatuses are substantially the same. Therefore, the data output apparatus 3 relays interactive communication rather than relaying one-way communication from the transmitting apparatus 4 to the receiving apparatus 5. Further, the first communication network 101 and the second communication network 102 may not be different communication networks, and may be the same communication network.

FIG. 17 is a block diagram showing an example of the configuration of the data output apparatus 3 of Embodiment 5 of the present invention.

The data output apparatus 3 of Embodiment 5 of the present invention comprises a control unit 30 such as a CPU for controlling the whole apparatus. Connected through a bus to the control unit 30 are various circuits including a storing unit 31 such as a flash memory and a RAM, a first communication unit 32a to be connected to the first communication network 101, a second communication unit 32b to be connected to the second communication network 102, a first accumulating unit 33a for use as a communication buffer for packets to be transmitted to the first communication network 101, and a second accumulating unit 33b for use as a communication buffer for packets to be transmitted to the second communication network 102. Further, in the storing unit 31 of the data output apparatus 3, a computer program 200 of the present invention is stored as firmware. Therefore, by reading the computer program 200 of the present invention stored in the storing unit 31 and executing it by the control unit 30, it is possible to cause the computer for communication to act as the data output apparatus 3 of the present invention.

Embodiment 5 of the present invention adopts a configuration in which various processes performed by the data output apparatus 1 in Embodiment 1 through Embodiment 4 are applied to a computer for communication, such as a relay apparatus. Although the data output apparatus 1 of Embodiment 1 through Embodiment 4 is configured to reproduce sound based on sound data included in the received packets as an output based on the packets, whereas the data output apparatus 3 of Embodiment 5 transmits the packets received from the transmitting apparatus 4 to the receiving apparatus 5 as an output based on the received packets.

The processes performed by the data output apparatus 3 of Embodiment 5 of the present invention are basically the same as the processes explained in Embodiment 1 through Embodiment 4. Specifically, sound data transmitted as packets from the transmitting apparatus 4 through the first communication network 101 is received by the first communication unit 32a and accumulated in the second accumulating unit 33b, and then the sound data accumulated in the second accumulating unit 32b is transmitted (outputted) at a predetermined time interval to the receiving apparatus 5 from the second communication unit 32b through the second communication network 102. Moreover, for the sound data to be accumulated in the second accumulating unit 33b, the initial accumulation amount to be used as a basis for starting to output the accumulated sound data and the upper accumulation limit amount to be used as a basis for discarding the received data are set.

Under the control of the control unit 30 executing the computer program 200 stored in the storing unit 31, the data output apparatus 3 checks the accumulated state of sound data accumulated in the second accumulating unit 33b. When a judgment is made that the accumulated amount of sound data accumulated in the second accumulating unit 33b is not less than the constant delay reference amount, the data output apparatus 3 judges whether or not discarding of sound data based on the upper accumulation limit amount has occurred. Then, when a judgment is made that discarding of sound data based on the upper accumulation limit amount has not occurred, the control unit 30 of the data output apparatus 3 decreases the set values of the initial accumulation amount and the upper accumulation limit amount. Whereas when a judgment is made that the discarding of sound data has occurred, the control unit 30 decreases the set value of the initial accumulation amount.

Moreover, under the control of the control unit 30 executing the computer program 200 stored in the storing unit 31, the data output apparatus 3 checks the accumulated state of sound data accumulated in the second accumulating unit 33b so as to adjust the set values of the initial accumulation amount and the upper accumulation limit amount at the set check interval. Then, when a judgment is made that the accumulated amount of sound data accumulated in the second accumulating unit 33*b* is not less than the constant delay reference amount, the control unit 30 discards the sound data accumulated in the second accumulating unit 33*b*. Further, when a non-accumulated state in which no sound data is accumulated in the second accumulating unit 33*b* occurs, the control unit 30 judges whether or not discarding of sound data based on the constant delay reference amount has occurred, and extends the set period of the check interval when a judgment is made that the discarding of sound data has occurred. For the details of the processes performed by the data output apparatus 3 of Embodiment 5, a reference should be made to Embodiment 1 through Embodiment 4, and the explanation is omitted.

Embodiment 5 described above illustrates an embodiment in which the processes performed as the data output apparatus of the present invention are carried out by executing the computer program of the present invention stored as firmware. However, the present invention is not limited to this and may be configured by mounting a hardware circuit for performing the functions of the data output apparatus of the present invention.

Although Embodiments 1 through 5 described above illustrate examples in which sound data is accumulated and outputted, the present invention is not limited to these examples, and is applicable to various types of streaming data such as image data as well as sound data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data output method for accumulating received data in an accumulating unit to which an initial accumulation amount as a basis for starting to output the accumulated data and an upper accumulation limit amount as a basis for discarding the accumulated data are set, and performing output based on the data accumulated in said accumulating unit, comprising the steps of:
 checking an accumulated state of the data accumulated in said accumulating unit, at a preset check interval;
 judging whether or not discarding of data based on said upper accumulation limit amount has occurred, when a judgment is made in said step of checking that an accumulated amount of the data accumulated in said accumulating unit is not less than a predetermined reference amount;
 decreasing set values of said initial accumulation amount and said upper accumulation limit amount, when a judgment is made that the discarding of the data has not occurred in the step of judging;
 decreasing the set value of said initial accumulation amount while said upper accumulation limit amount is left unchanged, when a judgment is made that the discarding of the data has occurred in the step of judging; and
 extending a set period of said check interval, when the judgment is made that the discarding of the data has occurred in the step of judging, wherein
the predetermined reference amount is a capacity amount of a buffer, which is used for the outputting of the data, the buffer being for temporarily storing the output data when the received data is outputted.

2. A data output method for accumulating received data in an accumulating unit to which an initial accumulation amount as a basis for starting to output the accumulated data and an upper accumulation limit amount as a basis for discarding the accumulated data are set, and performing output based on the data accumulated in said accumulating unit, comprising the steps of:
 checking an accumulated state of the data accumulated in said accumulated unit, at a preset check interval;
 discarding the data accumulated in said accumulating unit, when a judgment is made in said step of checking that an accumulated amount of the data accumulated in said accumulating unit is not less than a predetermined reference amount;
 first judging whether or not a non-accumulated state in which no data is accumulated in said accumulating unit has occurred;
 second judging whether or not discarding of the data based on said reference amount has occurred, when a judgment is made that the non-accumulated state has occurred in the step of first judging; and
 extending a set period of said check interval, when a judgment is made that the discarding of the data based on said reference amount has occurred in the step of second judging.

3. A data output apparatus having an accumulating unit, to which an initial accumulation amount as a basis for starting to output accumulated data and an upper accumulation limit amount as a basis for discarding the accumulated data are set, for accumulating received data in said accumulating unit and performing output based on the data accumulated in said accumulating unit comprising:
 checking means for checking an accumulated state of the data accumulated in said accumulating unit, at a preset check interval;
 judging means for judging whether or not discarding of the data based on said upper accumulation limit amount has occurred, when said checking means judges that an accumulated amount of the data accumulated in said accumulating unit is not less than a predetermined reference amount;
 means for decreasing set values of said initial accumulation amount and said upper accumulation limit amount, when said judging means judges that the discarding of the data has not occurred;
 means for decreasing the set value of said initial accumulation amount and leaving said upper accumulation limit amount unchanged, when said judging means judges that the discarding of the data has occurred; and
 means for extending a set period of said check interval, when the judging means judges that the discarding of the data has occurred, wherein
the predetermined reference amount is a capacity amount of a buffer, which is used for the outputting of the data, the buffer being for temporarily storing the output data when the received data is outputted.

4. A data output apparatus having an accumulating unit, to which an initial accumulation amount as a basis for starting to output accumulated data and an upper accumulation limit amount as a basis for discarding the accumulated data are set, for accumulating received data in said accumulating unit and performing output based on the data accumulated in said accumulating unit, comprising:
 checking means for checking an accumulated state of the data accumulated in said accumulating unit, at a preset check interval;

data discarding means for discarding the data accumulated in said accumulating unit, when said checking means judges that an accumulated amount of the data accumulated in said accumulating unit is not less than a predetermined reference amount;

non-accumulated state judging means for judging whether or not a non-accumulated state in which no data is accumulated in said accumulating unit has occurred;

data discarding judging means for judging whether or not discarding of the data based on said reference amount has occurred, when said non-accumulated state judging means judges that the non-accumulated state has occurred; and check interval setting means for extending a set period of said check interval, when said data discarding judging means judges that the discarding of the data has occurred.

5. The data output apparatus as set forth in claim 4, wherein said setting changing means further includes non-accumulated state duration calculating means for calculating a non-accumulated state duration from a time point at which said checking means checked the accumulated state to a time point at which said non-accumulated state judging means detected occurrence of the non-accumulated state, and said check interval setting means determines an additional duration for extending said check interval based on the non-accumulated state duration calculated by said non-accumulated state duration calculating means.

6. The data output apparatus as set forth in claim 4, wherein said setting changing means further includes non-accumulated state occurrence interval calculating means for calculating an interval between respective time points at which the non-accumulated state occurred, when said non-accumulated state judging means judges that the non-accumulated state occurred a plurality of times, and said check interval setting means determines an additional duration for extending said check interval based on the duration calculated by said non-accumulated state occurrence interval calculating means.

7. The data output apparatus as set forth in claim 4, wherein said setting changing means further includes non-accumulated state duration calculating means for calculating a duration from a time point at which said checking means checked the accumulated state to a time point of the last occurrence of the non-accumulated state, when said non-accumulated state judging means judges that the non-accumulated state occurred a plurality of times, and said check interval setting means determines an additional duration for extending said check interval based on the duration calculated by said non-accumulated state duration calculating means.

8. A data output apparatus having a memory device, to which an initial accumulation amount as a basis for starting to output accumulated data and an upper accumulation limit amount as a basis for discarding the accumulated data are set, for accumulating received data in said memory device and performing output based on the data accumulated in said memory device, comprising a control unit coupled to said memory device and capable of performing the following operations of:

checking an accumulated state of the data accumulated in said memory device, at a preset check interval;

judging whether or not discarding of data based on said upper accumulation limit amount has occurred, when a judgment is made in said operation of checking that an accumulated amount of the data accumulated in said memory device is not less than a predetermined reference amount;

decreasing set values of said initial accumulation amount and said upper accumulation limit amount, when a judgment is made that the discarding of the data has not occurred in the operation of judging; and decreasing the set value of said initial accumulation amount while said upper accumulation limit amount is left unchanged, when a judgment is made that the discarding of the data has occurred in the operation of judging; and extending a set period of said check interval, when the judgement is made that the discarding of the data has occurred in the operation of judging, wherein the predetermined reference amount is a capacity amount of a buffer, which is used for the outputting of the data, the buffer being for temporarily storing the output data when the received data is outputted.

9. A data output apparatus having a memory device, to which an initial accumulation amount as a basis for starting to output accumulated data and an upper accumulation limit amount as a basis for discarding the accumulated data are set, for accumulating received data in said memory device and performing output based on the data accumulated in said memory device, comprising a control unit coupled to said memory device and capable of performing the following operations of:

checking an accumulated state of the data accumulated in said memory device, at a preset check interval;

discarding the data accumulated in said memory device, when a judgment is made in said operation of checking that an accumulated amount of the data accumulated in said memory device is not less than a predetermined reference amount;

first judging whether or not a non-accumulated state in which no data is accumulated in said memory device has occurred;

second judging whether or not discarding of the data based on said reference amount has occurred, when a judgment is made that the non-accumulated state has occurred in the operation of first judging; and extending a set period of said check interval, when a judgment is made that the discarding of the data has occurred in the operation of second judging.

10. The data output apparatus as set forth in claim 9, wherein, in said operation of changing setting, said control unit further capable of performing an operation of calculating a non-accumulated state duration from a time point at which the accumulated state was checked in said operation of checking to a time point at which occurrence of the non-accumulated state was detected in said operation of judging whether or not the non-accumulated state has occurred, and said operation of extending a set period of said check interval determines an additional duration for extending said check interval based on the non-accumulated state duration calculated by said operation of calculating the non-accumulated state duration.

11. The data output apparatus as set forth in claim 9, wherein, in said operation of changing setting, said control unit further capable of performing an operation of calculating a duration between respective time points at which the non-accumulated state occurred, when a judgment is made in said operation of judging the non-accumulated state that the non-accumulated state occurred a plurality of times, and said operation of setting the check interval determines an additional duration for extending said check interval based on the duration calculated by said operation of calculating the non-accumulated state occurrence interval.

12. The data output apparatus as set forth in claim 9, wherein, in said operation of changing setting, said control unit further capable of performing an operation of calculating a non-accumulated state duration from a time point at which the accumulated state was checked in said operation of checking to a time point of the last occurrence of the non-accumulated state, when a judgment is made in said operation of judging the non-accumulated state that the non-accumulated state occurred a plurality of times, and said operation of setting the check interval determines an additional duration for extending said check interval based on the duration calculated by said operation of calculating the non-accumulated state duration.

13. A computer program embodied in a computer readable storage medium for accumulating received data in a memory device and controlling output based on the accumulated data, the computer program comprising computer instructions for:

checking an accumulated state of the data accumulated in said memory device, to which an initial accumulation amount as a basis for starting to output accumulated data and an upper accumulation limit amount as a basis for discarding the accumulated data are set, at a preset check interval;

judging whether or not discarding of the data based on said upper accumulation limit amount has occurred, when an accumulated amount of the data accumulated in said memory device is judged to be not less than a predetermined reference amount on the basis of the check results;

decreasing set values of said initial accumulation amount and said upper accumulation limit amount, when a judgment is made that the discarding of the data has not occurred; and decreasing the set value of said initial accumulation amount while said upper accumulation limit amount is left unchanged, when a judgment is made that the discarding of the data has occurred; and extending a set period of said check interval, when the judgment is made that the discarding of the data has occurred, wherein the predetermined reference amount is a capacity amount of a buffer, which is used for the outputting of the data, the buffer being for temporarily storing the output data when the received data is outputted.

14. A computer program embodied in a computer readable storage medium for accumulating received data in a memory device and controlling output based on the accumulated data, the computer program comprising computer instructions for:

checking an accumulated state of the data accumulated in said memory device, to which an initial accumulation amount as a basis for starting to output accumulated data and an upper accumulation limit amount as a basis for discarding the accumulated data are set, at a preset check interval;

discarding the data accumulated in said memory device, when an accumulated amount of the data accumulated in said memory device is judged to be not less than a predetermined reference amount on the basis of the check results;

judging whether or not a non-accumulated state in which no data is accumulated in said memory device has occurred;

judging whether or not discarding of the data based on said reference amount has occurred, when a judgment is made that the non-accumulated state has occurred; and extending a set period of said check interval, when a judgment is made that discarding of the data based on said reference amount has occurred.

15. A data output method of performing output based on data which is received from outside and is accumulated in an accumulating unit whose capacity is defined by an initial accumulation amount and an upper accumulation limit amount, the initial accumulation amount being a basis for starting to perform the output of the accumulated data, the upper accumulation limit amount being a basis for discarding a portion of the accumulated data without the portion outputted, the discarding reducing current accumulation amount in the capacity by an amount of the portion, the method comprising:

checking an accumulation state of the accumulated data at a preset check interval, the checking step includes:

a first judging step of judging whether or not the current accumulation amount of the accumulated data is equal to or greater than a predetermined reference amount;

and a second judging step of judging, when the judging in the first judging step is affirmative, whether or not the portion of the accumulated data is discarded based on the upper accumulation limit amount;

decreasing the initial accumulation amount and the upper accumulation limit amount, when the judging in the second judging step is negative; and decreasing the initial accumulation amount and leaving the upper accumulation limit amount unchanged, when the judging in the second judging step is affirmative; and extending a set period of said check interval, when the judging in the second judging step is affirmative, wherein the predetermined reference amount is a capacity amount of a buffer, which is used for the outputting of the data, the buffer being for temporarily storing the output data when the received data is outputted.

* * * * *